US010883391B2

(12) United States Patent
Turner et al.

(10) Patent No.: US 10,883,391 B2
(45) Date of Patent: Jan. 5, 2021

(54) EGR COOLER

(71) Applicant: Ford Global Technologies, LLC, Dearborn, MI (US)

(72) Inventors: Paul Nigel Turner, Chelmsford (GB); Kevin John Maile, Southend on Sea (GB); Chris Michael Raines, Tillingham (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/518,716

(22) Filed: Jul. 22, 2019

(65) Prior Publication Data
US 2019/0345849 A1 Nov. 14, 2019

Related U.S. Application Data

(63) Continuation of application No. 15/482,667, filed on Apr. 7, 2017, now Pat. No. 10,422,253.
(Continued)

(51) Int. Cl.
*F01P 3/12* (2006.01)
*F02M 26/25* (2016.01)
(Continued)

(52) U.S. Cl.
CPC ............. *F01L 1/024* (2013.01); *F01M 1/02* (2013.01); *F16H 7/14* (2013.01);
(Continued)

(58) Field of Classification Search
CPC ........ F01P 2060/16; F01P 3/12; F02M 26/33; F02M 26/25; F02M 26/22
See application file for complete search history.

(56) References Cited

U.S. PATENT DOCUMENTS 4,258,687 A * 3/1981 Mauch ..................... F01P 3/18
123/184.33
4,531,494 A 7/1985 Bailey et al.
(Continued)

FOREIGN PATENT DOCUMENTS

CN 1432104 A 7/2003
CN 201347800 Y 11/2009
(Continued)

OTHER PUBLICATIONS

"All-New Ford EcoBlue Engine is Diesel Game Changer—Cleaner, More Fuel Efficient, More Power, More Torque," Ford Media Center Website, Available Online at https://media.ford.com/content/fordmedia/feu/en/news/2016/04/26/all-new-ford-ecoblue-engine-is-diesel-game-changer-cleaner--mor.html, Available as Early as Apr. 26, 2016, 5 pages.
(Continued)

*Primary Examiner* — Long T Tran
(74) *Attorney, Agent, or Firm* — Geoffrey Brumbaugh; McCoy Russell LLP

(57) ABSTRACT

Methods and systems are provided for a cam drive system of an engine. In one example, a front end of an engine includes an idler gear assembly including an idler gear and idler pulley, the idler gear in meshing engagement with a first end of a crankshaft and the idler pulley coupled to and sharing a rotational axis with the idler gear. The front end of the engine may further include first and second camshaft pulleys positioned vertically above the idler gear assembly and a cam drive belt contacting each of the first and second camshaft pulleys and the idler pulley.

20 Claims, 18 Drawing Sheets

Related U.S. Application Data

(60) Provisional application No. 62/327,943, filed on Apr. 26, 2016.

(51) Int. Cl.
| | | |
|---|---|---|
| *F01L 1/02* | (2006.01) | |
| *F01M 1/02* | (2006.01) | |
| *F16H 7/14* | (2006.01) | |
| *F01L 1/053* | (2006.01) | |
| *F16H 7/08* | (2006.01) | |

(52) U.S. Cl.
CPC .......... *F01L 2001/0537* (2013.01); *F01M 2001/0269* (2013.01); *F16H 2007/0865* (2013.01); *F16H 2007/0893* (2013.01)

(56) References Cited

U.S. PATENT DOCUMENTS

| | | | |
|---|---|---|---|
| 5,533,475 A | 7/1996 | Deane | |
| 5,839,401 A | 11/1998 | Gruber et al. | |
| 5,931,052 A | 8/1999 | Zhao et al. | |
| 6,293,757 B1 | 9/2001 | Oda et al. | |
| 6,360,711 B1 | 3/2002 | Itoh | |
| 6,367,442 B1 | 4/2002 | Takayanagi | |
| 6,415,758 B1 | 7/2002 | Pierro et al. | |
| 6,715,376 B2 | 4/2004 | Hojyo et al. | |
| 6,976,476 B1 | 12/2005 | Mantri | |
| 8,951,025 B2 | 2/2015 | Schultz | |
| 9,422,835 B2 | 8/2016 | Ikeda | |
| 9,470,187 B2* | 10/2016 | Gliwa | F02M 26/28 |
| 2001/0032635 A1 | 10/2001 | Kimura | |
| 2002/0121152 A1 | 9/2002 | White et al. | |
| 2003/0168048 A1 | 9/2003 | Koga et al. | |
| 2004/0107940 A1 | 6/2004 | Elliott et al. | |
| 2006/0021599 A1 | 2/2006 | Ciampolini | |
| 2006/0243236 A1 | 11/2006 | Okamoto | |
| 2007/0193541 A1 | 8/2007 | Imamura | |
| 2008/0156563 A1 | 7/2008 | Shiozaki et al. | |
| 2008/0184974 A1* | 8/2008 | Kobayashi | F02M 26/26 |
| | | | 123/568.12 |
| 2009/0133653 A1 | 5/2009 | Duzzie et al. | |
| 2009/0301429 A1 | 12/2009 | Takashina et al. | |
| 2010/0139431 A1 | 6/2010 | Park | |
| 2010/0170482 A1* | 7/2010 | Feist | F02M 26/30 |
| | | | 123/568.12 |
| 2010/0294231 A1 | 11/2010 | Kusel | |
| 2011/0073060 A1 | 3/2011 | Morgan et al. | |
| 2011/0209680 A1 | 9/2011 | Katayama et al. | |
| 2011/0315129 A1* | 12/2011 | Kojima | F02M 26/19 |
| | | | 123/568.12 |
| 2012/0037121 A1 | 2/2012 | Kajita et al. | |
| 2012/0138003 A1 | 6/2012 | Petry-Johnson et al. | |
| 2012/0138009 A1 | 6/2012 | Petry-Johnson et al. | |
| 2012/0260891 A1 | 10/2012 | Love et al. | |
| 2012/0291747 A1 | 11/2012 | Jurjevec et al. | |
| 2013/0206121 A1 | 8/2013 | Nishikawa | |
| 2013/0228029 A1 | 9/2013 | Murphy et al. | |
| 2014/0224234 A1 | 8/2014 | Zhou et al. | |
| 2014/0238357 A1 | 8/2014 | Yun et al. | |
| 2014/0261258 A1 | 9/2014 | Fronk et al. | |
| 2014/0318495 A1 | 10/2014 | Chong | |
| 2015/0033893 A1 | 2/2015 | Bell et al. | |
| 2015/0083068 A1 | 3/2015 | Sugiura et al. | |
| 2015/0211455 A1 | 7/2015 | Hasegawa et al. | |
| 2015/0233268 A1 | 8/2015 | Ikeda | |
| 2015/0354507 A1* | 12/2015 | Park | F02M 25/0737 |
| | | | 123/568.12 |
| 2016/0230708 A1* | 8/2016 | Yang, II | F02M 26/28 |
| 2016/0230709 A1* | 8/2016 | Yang, II | F02M 26/32 |
| 2017/0335811 A1 | 11/2017 | Turner et al. | |
| 2018/0163672 A1* | 6/2018 | Seo | F01K 23/10 |
| 2018/0216580 A1* | 8/2018 | Meano | F02M 26/28 |

FOREIGN PATENT DOCUMENTS

| | | |
|---|---|---|
| CN | 103277222 A | 9/2013 |
| DE | 102004033948 A1 | 2/2006 |

OTHER PUBLICATIONS

United States Patent and Trademark Office, Office Action Issued in U.S. Appl. No. 15/482,657, dated Sep. 21, 2018, 16 pages.
United States Paten and Tradernark Office, Office Action Issued in U.S. Appl. No. 15/482,657, dated Apr. 3, 2019, 13 pages.
National Intellectual Property Administration of the People's Republic of China, Office Action and Search Report Issued in Application No. 201710282076.1, dated Jun. 18, 2020, 18 pages. (Submitted with Partial Translation).

* cited by examiner

US 10,883,391 B2

EGR COOLER

CROSS REFERENCE TO RELATED APPLICATIONS

The present application is a continuation of U.S. Non-Provisional patent application Ser. No. 15/482,667, entitled "CAM DRIVE SYSTEM FOR AN ENGINE", and filed on Apr. 7, 2017. U.S. Non-Provisional patent application Ser. No. 15/482,667 claims priority to U.S. Provisional Patent Application No. 62/327,943 entitled "CAM DRIVE SYSTEM FOR AN ENGINE," filed on Apr. 26, 2016. The entire contents of each of the above-referenced applications are hereby incorporated by reference for all purposes.

FIELD

The present description relates generally to methods and systems for a cam drive system of an engine.

BACKGROUND/SUMMARY

Packaging space for an engine within a vehicle may be limited. In particular, a height, length, and/or width of an engine may be limited by a size of the vehicle. However, the large number of engine components, particularly for a diesel engine, may be difficult to fit within a frame of smaller vehicles. For example, the front end of an engine may include a plurality of drive mechanisms for driving engine components using rotational energy from a crankshaft of the engine. In particular, camshafts may be driven by camshaft pulleys that are rotationally coupled to a crankshaft directly through a drive belt. However, the inventors herein have recognized that coupling the camshaft pulleys directly to the crankshaft via a belt increases the size of the pulleys needed to maintain a desired gear ratio between the crankshaft and the camshafts. Thus, due to the increased size of the camshaft pulleys, such systems increase the overall height and/or width of the engine.

In one example, the issues described above may be addressed by a front end of an engine comprising, a first end of a crankshaft, an idler gear assembly including an idler gear and an idler pulley, the idler gear in meshing engagement with the first end of the crankshaft and the idler pulley coupled to and sharing a rotational axis with the idler gear, first and second camshaft pulleys positioned vertically above the idler gear assembly, and a cam drive belt contacting each of the first and second camshaft pulleys and the idler pulley. In this way, by coupling the camshaft pulleys to the idler gear, the size of the camshaft pulleys may be reduced, and thus the size of the engine system may correspondingly be reduced as well.

In another representation, a method for an engine may comprise transmitting rotational motion from a crankshaft to an idler gear, the idler gear meshing with a first end of the crankshaft via a plurality of interlocking teeth, rotating an idler pulley directly coupled with the idler gear via rotation of the idler gear, the idler gear and idler pulley sharing a rotational axis, and driving rotation of first and second camshaft pulleys through a cam drive belt driven by the idler pulley, the cam drive belt contacting an outer surface of the first and second camshaft pulleys and the idler pulley.

In yet another representation, a system for an engine may comprise a front end, comprising: a first end of a crankshaft, an idler gear assembly including an idler gear and idler pulley, the idler gear in meshing engagement with the first end of the crankshaft and the idler pulley coupled to and sharing a rotational axis with the idler gear, first and second camshaft pulleys coupled to first and second camshafts, respectively, and a cam drive belt contacting each of the first and second camshaft pulleys and the idler pulley and not the first end of the crankshaft, and a back end arranged opposite the front end, the back end including a flywheel coupled to a second end of the crankshaft. In some examples, the idler gear may include more teeth than the first end of the crankshaft. Additionally or alternatively, the idler gear may comprise a larger diameter than the first end of the crankshaft.

Thus, the idler gear may rotate at a slower rate than the crankshaft due to its greater number of teeth and larger diameter. As such, by coupling the camshaft pulleys to the slower rotating idler gear, the diameter of the camshaft pulleys may be reduced. By reducing the size of the camshaft pulleys, the overall size of the engine system may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-18 are drawn to scale, though other relative dimensions may be used.

DETAILED DESCRIPTION

Figure 9:
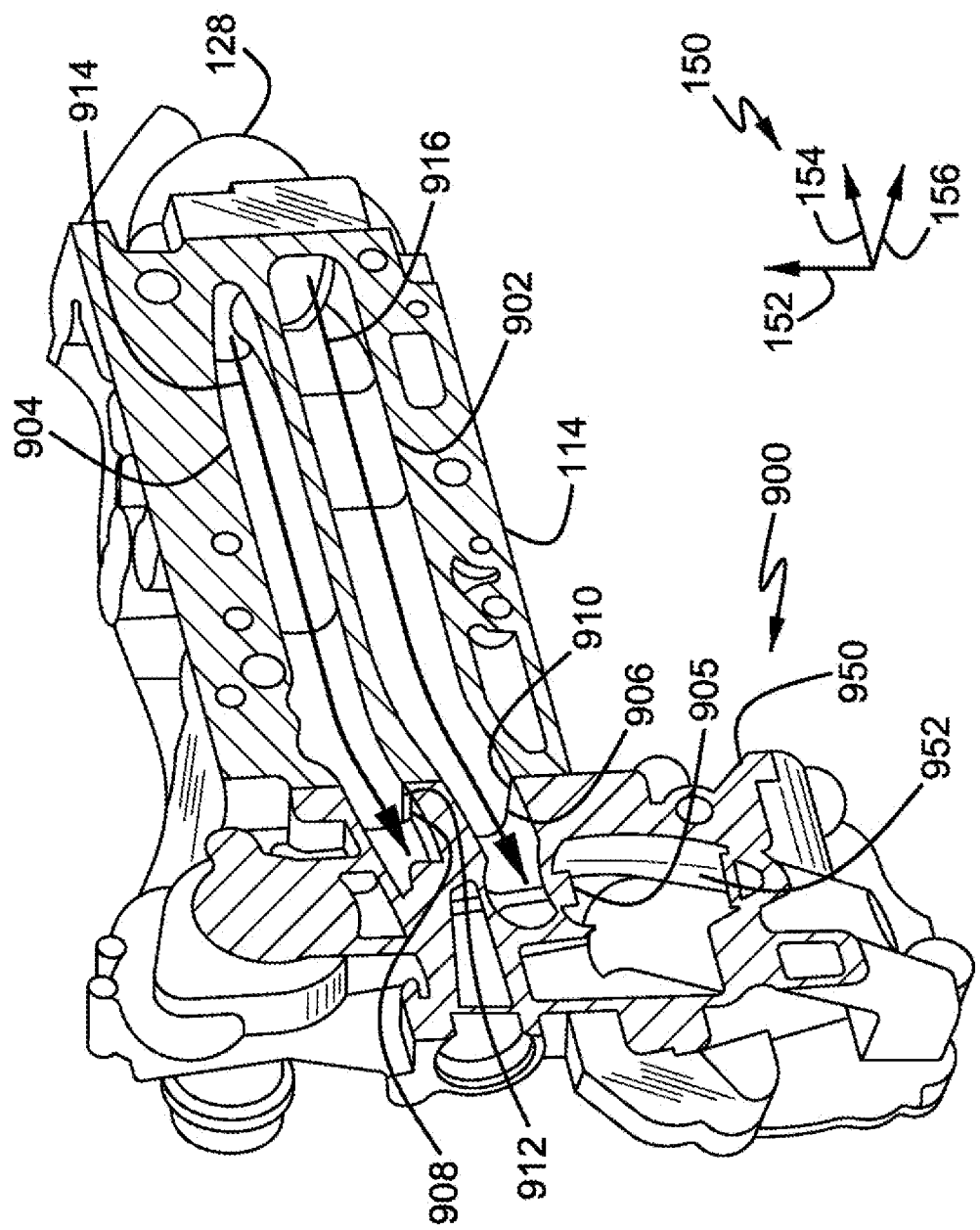
FIG. 9 shows a cross-sectional view of a cylinder head of the example engine system of FIG. 1 and illustrates example flow paths of engine coolant and engine exhaust gases through the cylinder head.
Figure 10:
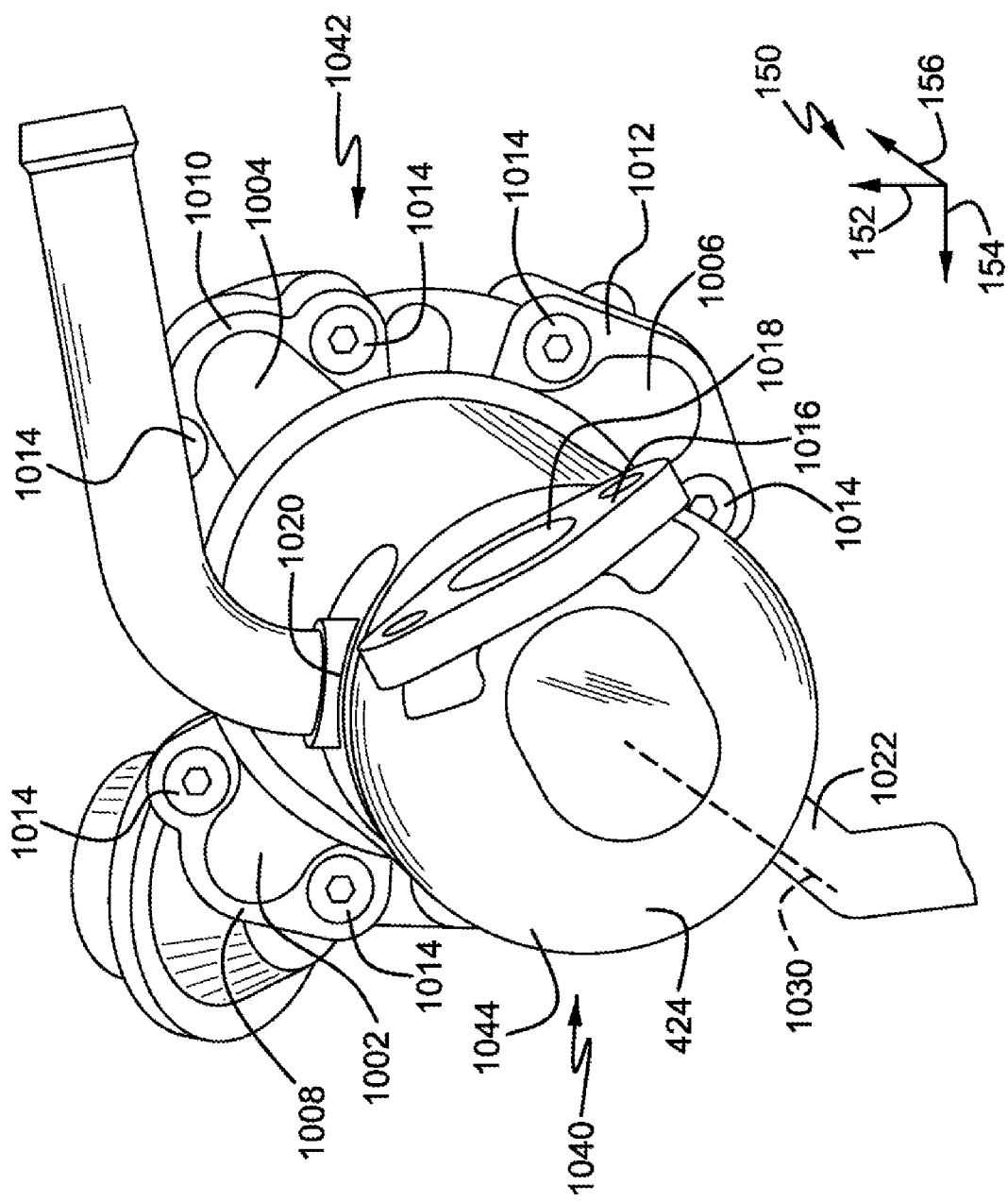
FIG. 10 shows an exhaust gas recirculation (EGR) cooler included by the example engine system of FIG. 1.
Figure 11:
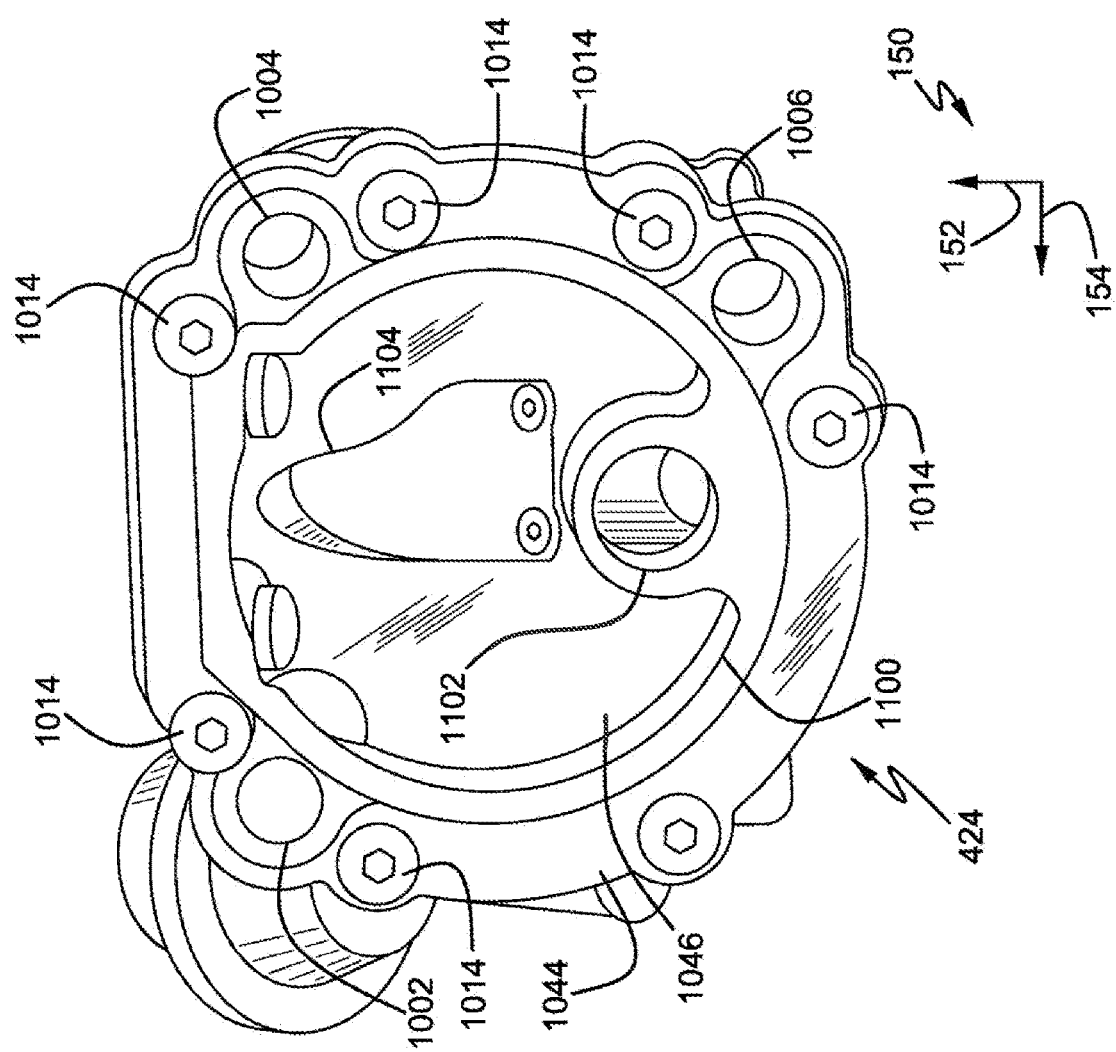
FIG. 11 shows a first cross-sectional view of the EGR cooler included by the example engine system of FIG. 1.
Figure 12:
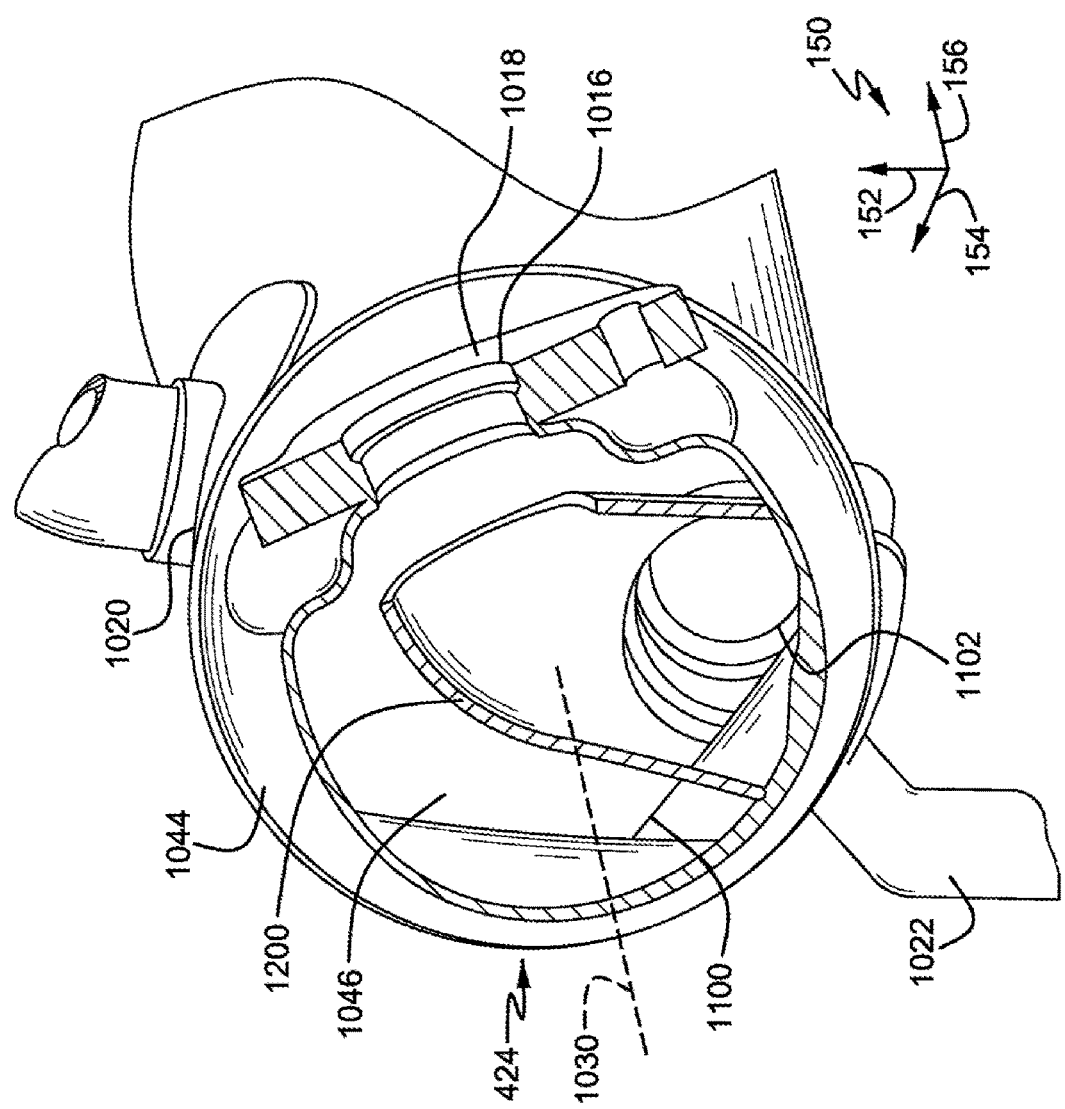
FIG. 12 shows a second cross-sectional view of the EGR cooler included by the example engine system of FIG. 1.
Figure 13:
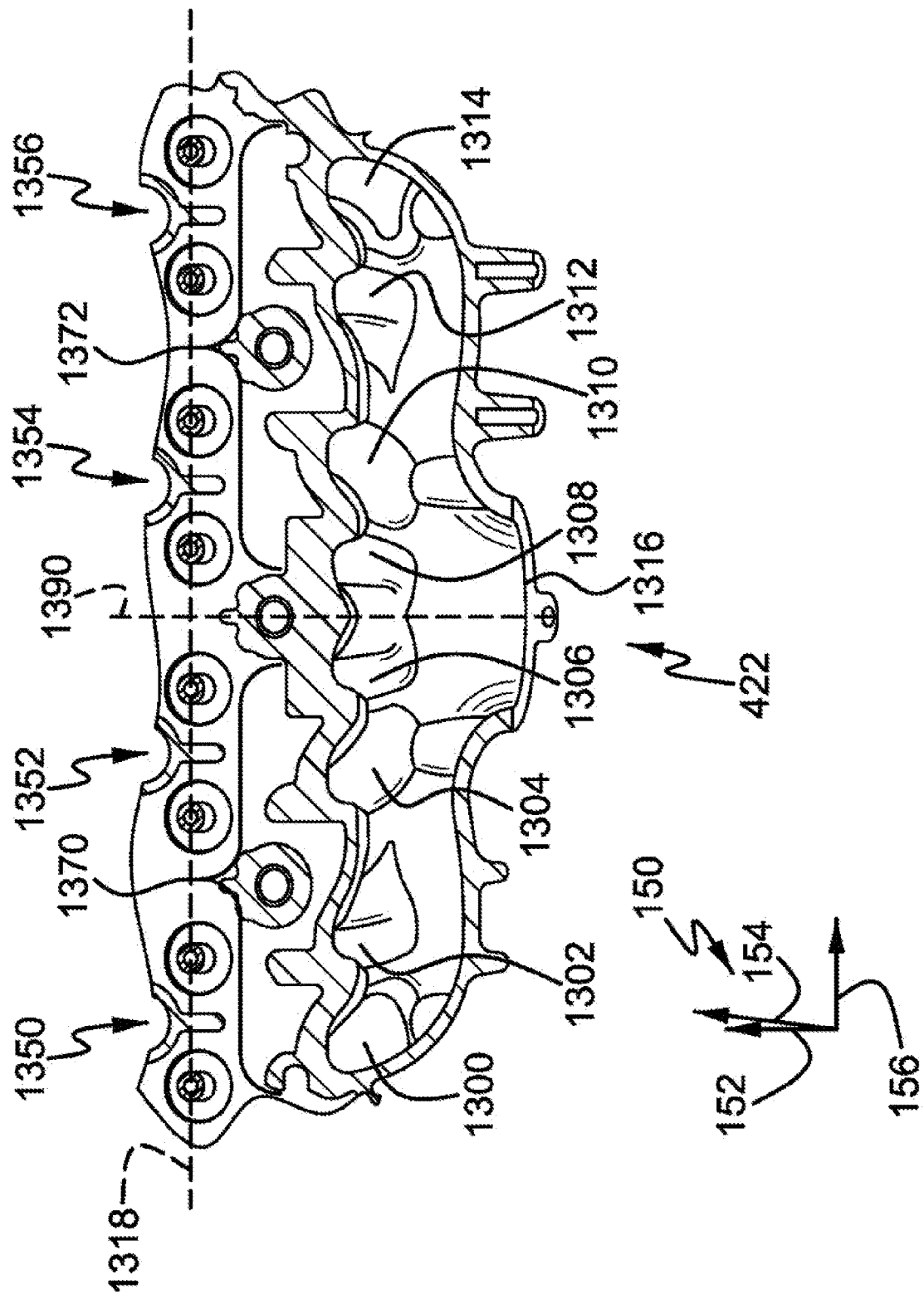
FIG. 13 shows a cross-sectional view of an intake manifold included by the example engine system of FIG. 1.
Figure 14:
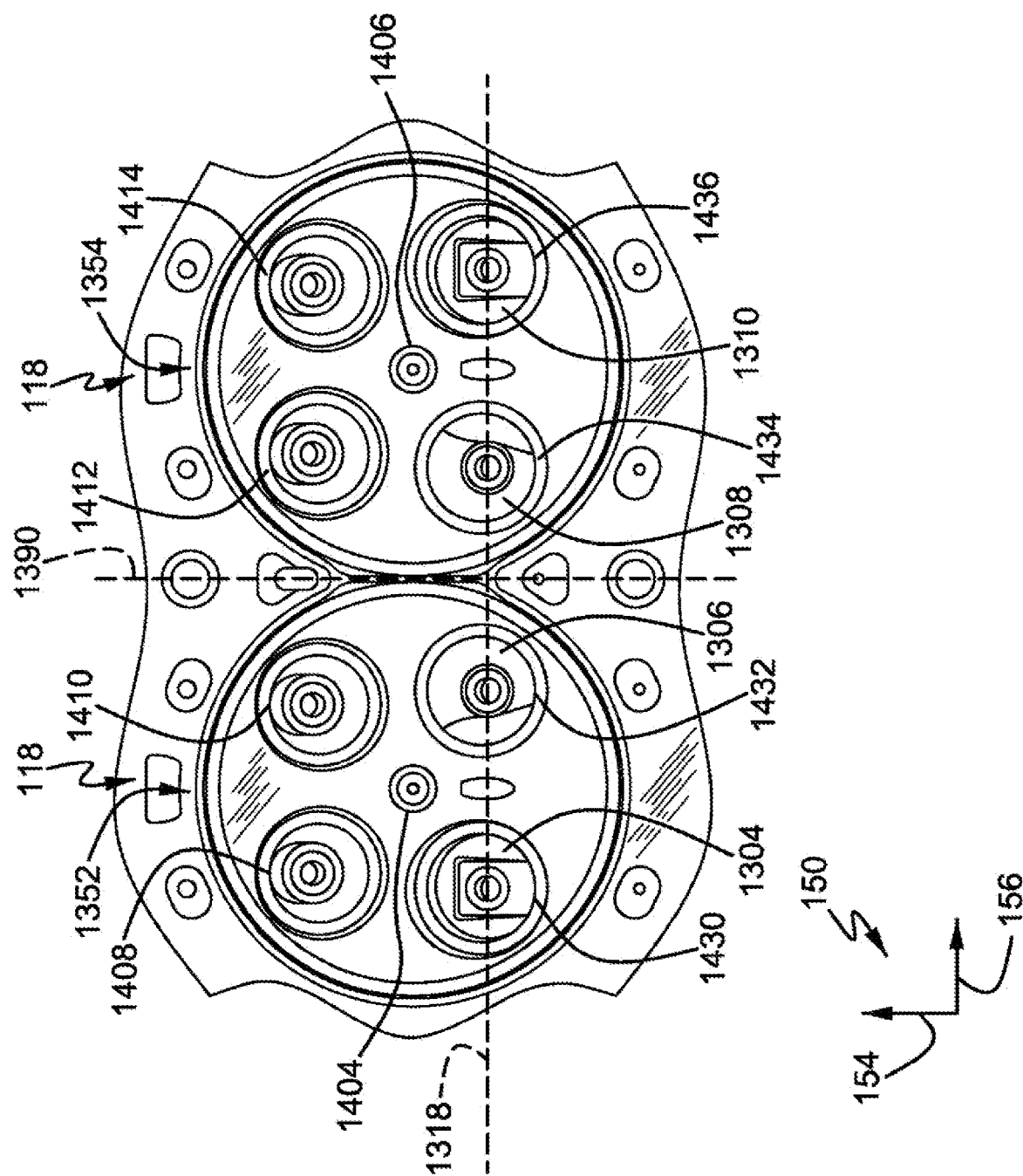
FIG. 14 shows a cross-sectional view of two cylinders included by the example engine system of FIG. 1.
Figure 15:
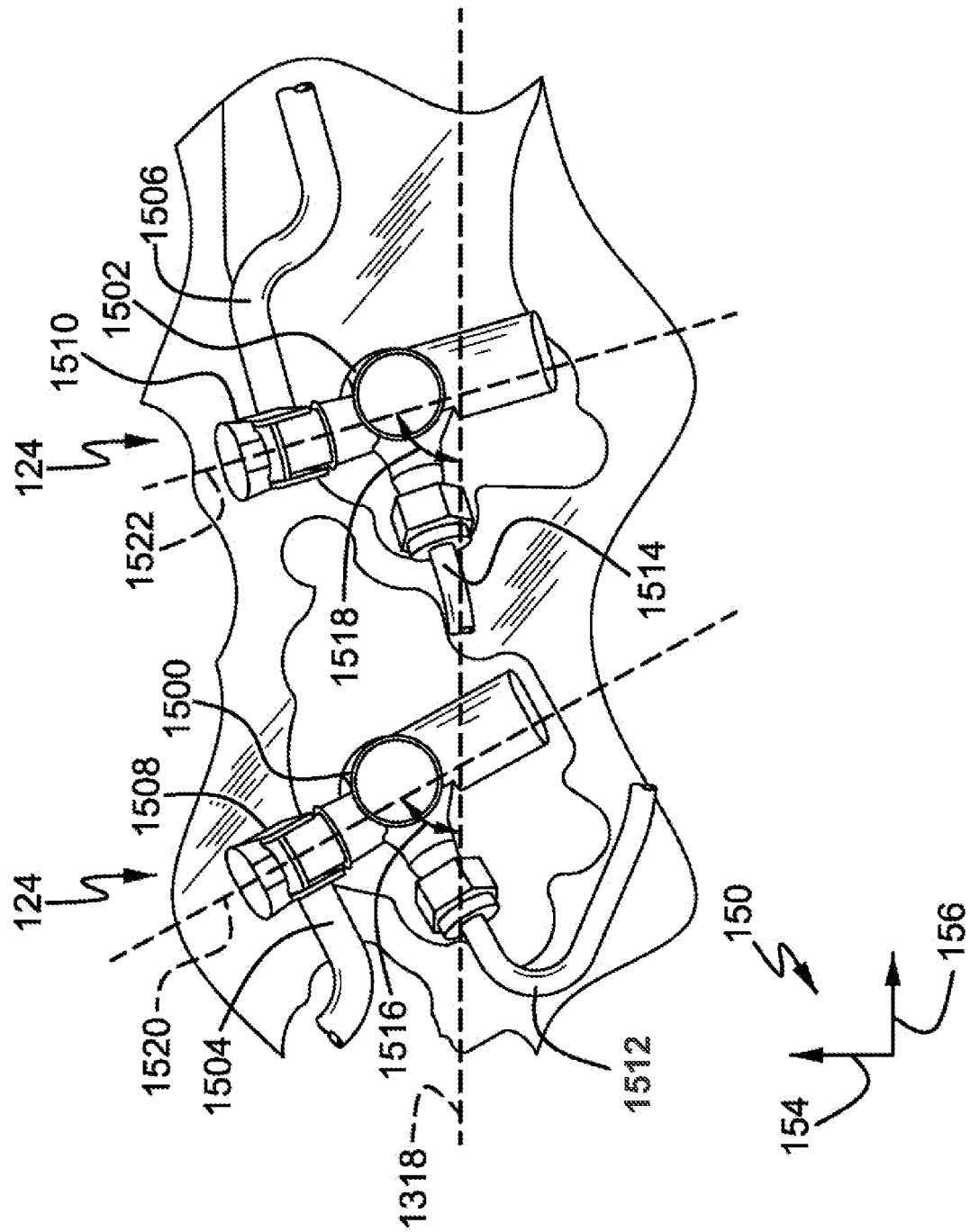
FIG. 15 shows a partial view of the example engine system of FIG. 1 and illustrates a relative arrangement of two fuel injectors coupled to the engine system.
Figure 16:
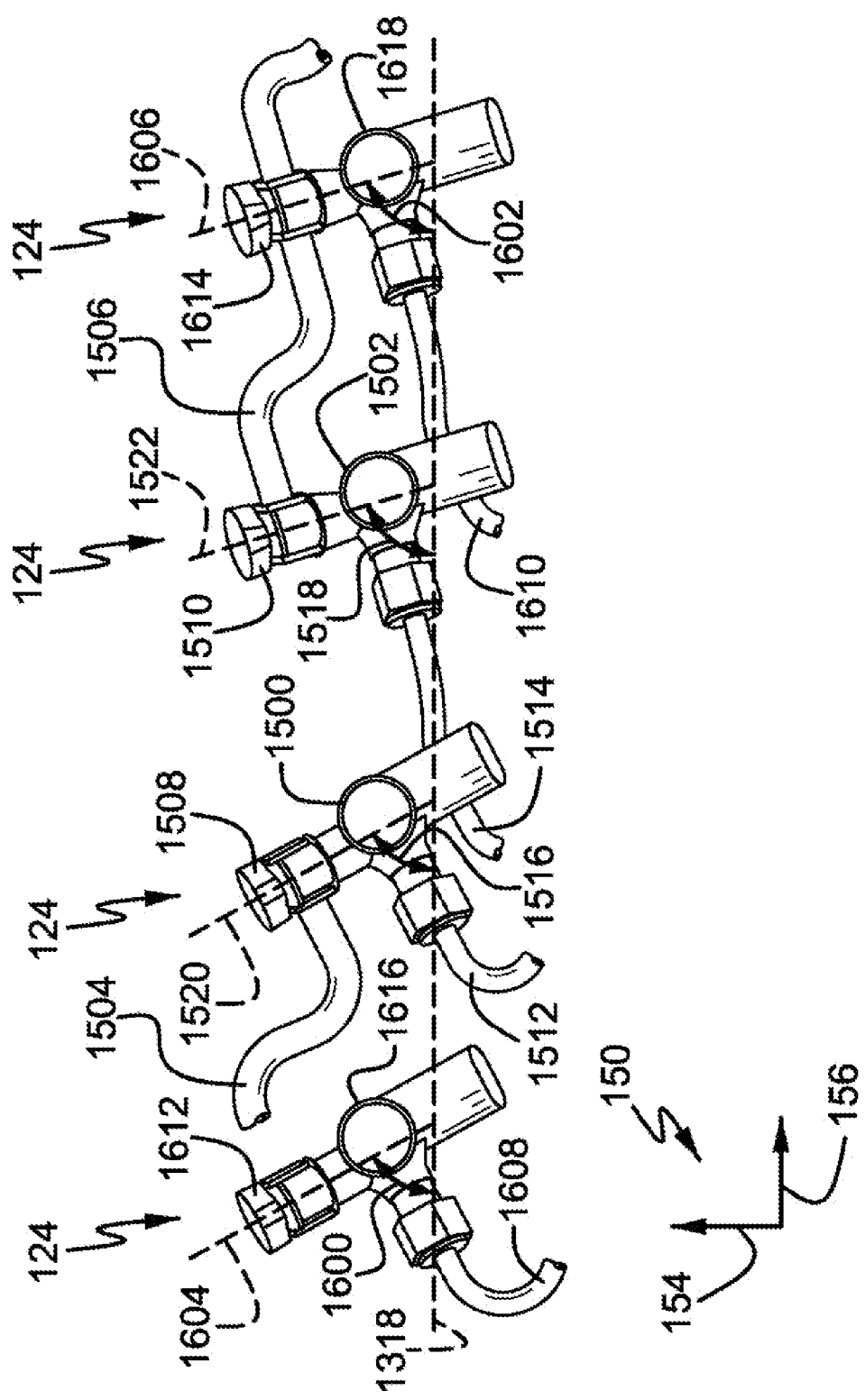
FIG. 16 shows a group of fuel injectors configured to couple with the example engine system of FIG. 1, with the group of fuel injectors including the two fuel injectors shown by FIG. 15.
Figure 17:
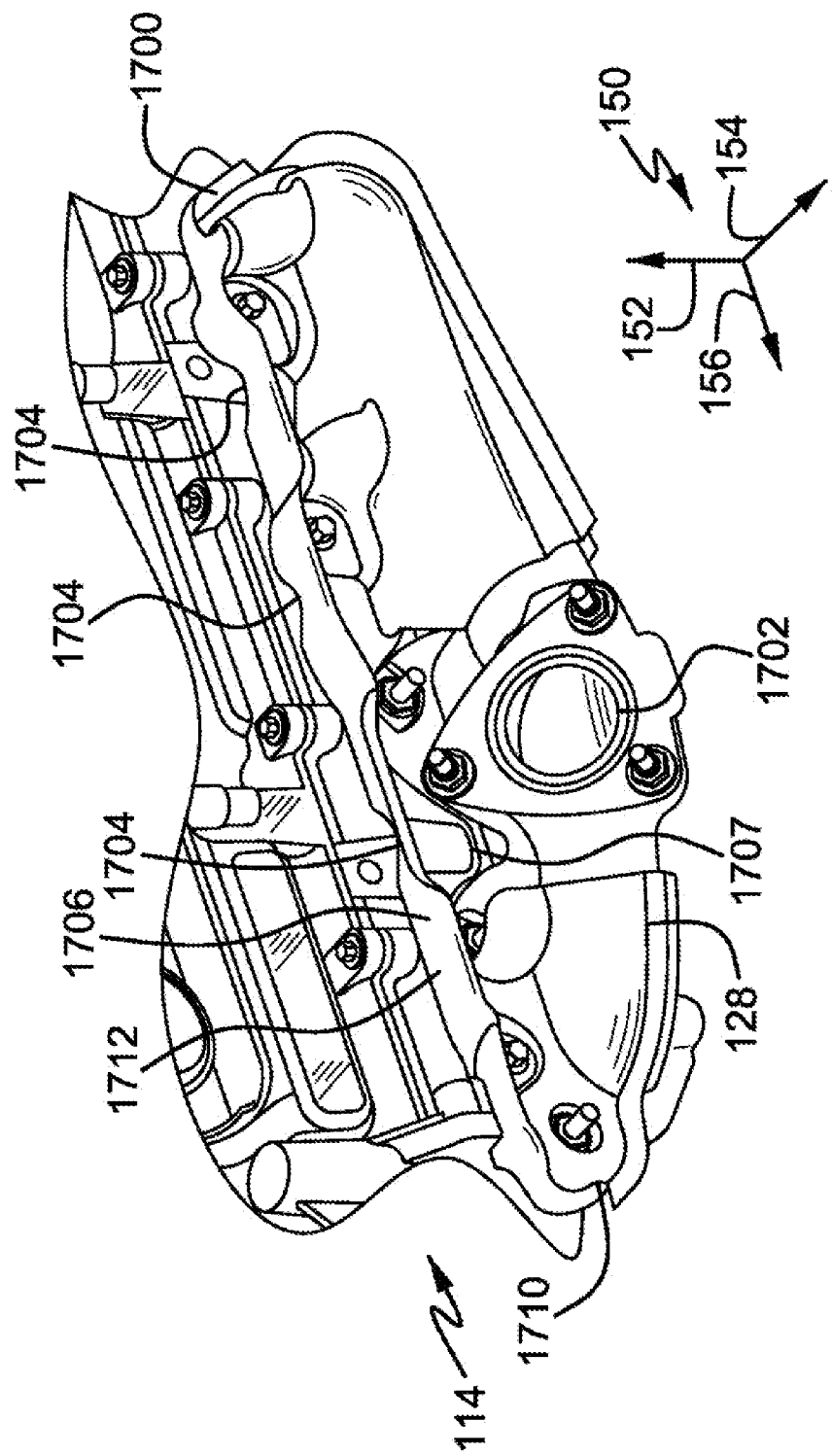
FIG. 17 shows a fluid-routing gasket coupled to an exhaust manifold of the example engine system of FIG. 1.

The following description relates to systems and methods for mechanically driving a diesel fuel injection pump and for driving one or more camshafts of an engine system. A diesel engine, such as the example diesel engine shown by FIGS. 1-8 and described herein with reference to FIGS. 1-18, may be powered by diesel fuel. The engine may include an exhaust gas recirculation (EGR) system having a plurality of passages formed within a cylinder head of the engine for flowing coolant and exhaust gases to an EGR valve assembly, as shown by FIG. 9. The EGR valve assembly is configured to direct coolant and exhaust gases to an EGR cooler including a bypass passage coupled to a baffle, as shown by FIGS. 10-12. The baffle may route gases from the bypass passage to an outlet of the EGR cooler and reduce a likelihood of gases from the bypass passage recirculating within the EGR cooler. The engine may additionally include an intake manifold having helical intake runners and non-helical intake runners positioned in an alternating arrangement (as shown by FIGS. 13-14) to increase a swirl of intake air within the combustion chambers. Fuel injectors of the engine may be positioned at different angles relative to each other (as shown by FIGS. 15-16) in order to shape a spray pattern from each fuel injector to accommodate the increased amount of swirl of the intake air. An exhaust manifold of the engine may include a heat-shielding gasket including a plurality of channels shaped to route fluid (e.g., oil leaks) away from an exterior of the exhaust manifold as shown by FIG. 17.

Figure 18:
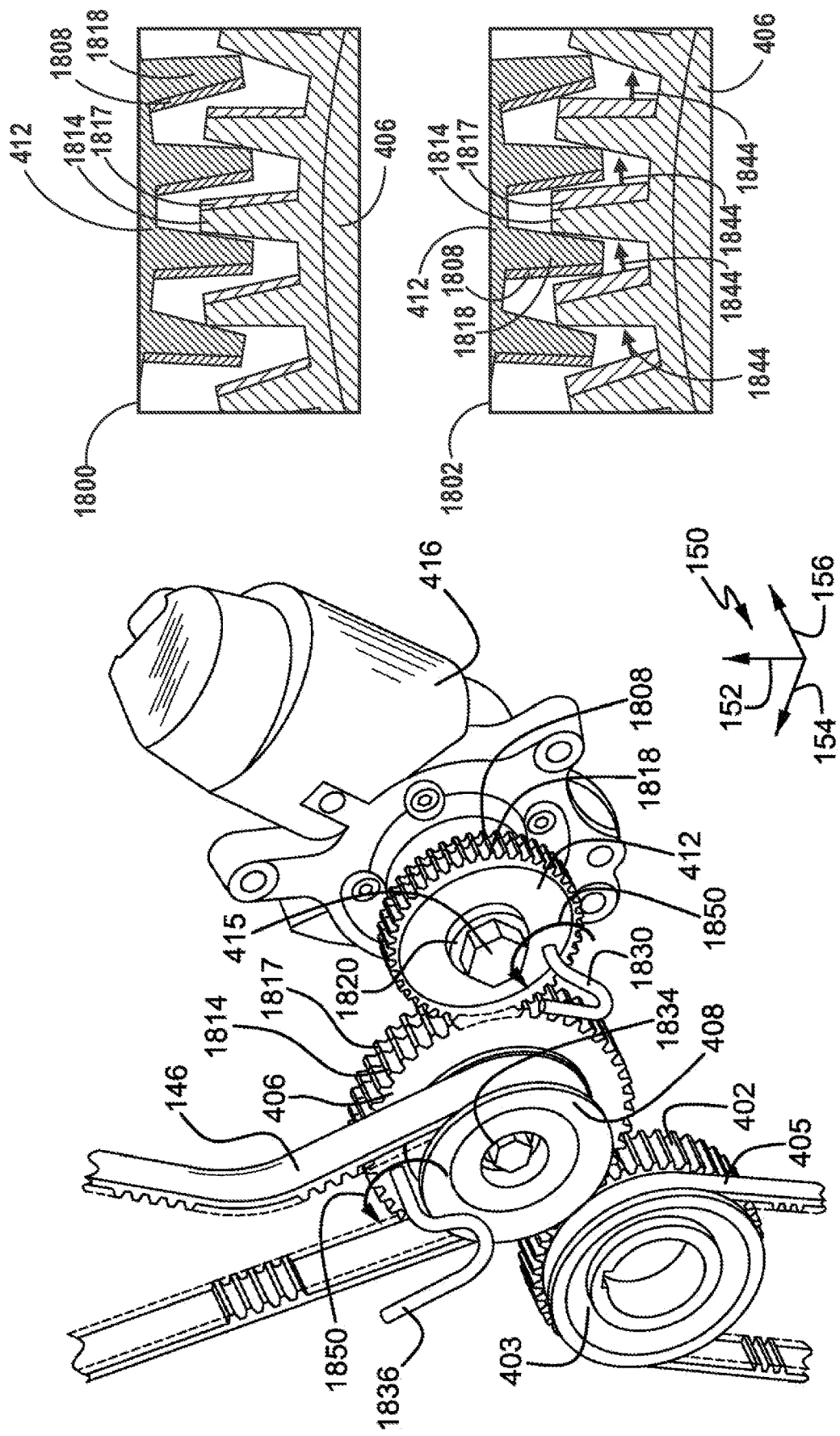
FIG. 18 shows an enlarged view of a fuel pump of the example engine system of FIG. 1.

The engine may include a diesel fuel pump for pumping the fuel to combustion chambers of the engine. The pump may be driven by the engine. In particular, energy output from combustion of the fuel in the combustion chambers may be used to drive rotational motion of a crankshaft, which may then be used to power the fuel pump. As shown in the examples of FIGS. 4-8, the crankshaft may include a gear at a first end of the crankshaft, proximate to or at a front end of the engine. The crankshaft gear may be in meshing engagement with an idler gear of an idler gear assembly such that rotational motion of the crankshaft drives rotational motion of the idler gear. The idler gear may be positioned between the crankshaft gear and a gear of an input shaft of the fuel pump, and may be in meshing engagement with both. In this way, rotational motion of the crankshaft may be transferred to the fuel pump via the idler gear, where rotational motion of the crankshaft may be transferred to the idler gear, which is then transferred to the input shaft of the fuel pump. Rotational motion of the input shaft of the fuel pump may drive a piston of the fuel pump, which pressurizes fuel delivered to the combustion chambers. Thus, the fuel pump may be driven by one or more gears, and not by a belt or chain. In some examples, the fuel pump may be driven by a gear assembly including one or more scissor gears, as shown by FIG. 18. Additionally, driving the fuel pump via the gear drive system may reduce drive torque irregularities (e.g., such as those that occur with a belt driven system) and the resulting wear on components of the fuel pump, thereby increasing the longevity of the fuel pump.

The example engine described above and shown in FIGS. 1-8, may include camshafts which rotate to regulate opening and closing times of intake and exhaust valves of combustion chambers of the engine. Rotation of the camshafts may be driven by the crankshaft of the engine at a particular gear ratio to maintain a desired angular speed ratio between the camshafts and the crankshaft. In one example the desired angular speed ratio may be approximately 2:1 such that the camshafts complete one full rotation for approximately every two full rotations of the crankshaft.

The camshafts may be coupled to the idler gear assembly via a belt and respective pulleys, where the idler gear assembly is driven directly by the crankshaft via meshing teeth. Thus, the idler gear assembly may transmit torque from the crankshaft to the camshafts. As shown in the examples of FIGS. 4-8, the idler gear assembly may include more teeth than a first end of the crankshaft with which it is in meshing engagement. Thus, the idler gear assembly may rotate at a slower rate than the crankshaft. Due to the slower angular velocity of the idler gear assembly, the size of camshaft pulleys coupling the camshafts to the idler gear assembly may be reduced while maintaining the desired angular speed ratio between the camshafts and the crankshaft. As such, by reducing the size of the camshaft pulleys, the overall size of the engine may be reduced.

FIGS. 1-18 show the relative positioning of various components of an engine system. If shown directly contacting each other, or directly coupled, then such components may be referred to as directly contacting or directly coupled, respectively, at least in one example. Similarly, components shown contiguous or adjacent to one another may be contiguous or adjacent to each other, respectively, at least in one example. As an example, components lying in face-sharing contact with each other may be referred to as in face-sharing contact or physically contacting one another. As another example, elements positioned apart from each other with only a space there-between and no other components may be referred to as such, in at least one example.

As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example.

Further, FIGS. 1-18 include an axis system 150, which may be used to describe the relative positioning of components of the engine system. The axis system 150 may include a vertical axis 152, a lateral axis 154, and a longitudinal axis 156. The axes 152, 154, and 156 may be orthogonal to one another, thereby defining a three-dimensional axis system. As used herein, "top/bottom", "upper/lower", "above/below", may be relative to the vertical axis 152 and may be used to describe the positioning of elements of the figures relative to one another along the vertical axis 152. Similarly, "to the left/right of," and "to the side of" may be used to describe the positioning of elements of the figures relative to one another along the lateral axis 154 and may be used to describe the positioning of elements of the figures relative to one another along the lateral axis 154. Further, "in front of," and "behind" may be relative to the longitudinal axis 156 and may be used to describe the positioning of element of the figures relative to one another along the longitudinal axis 156.

As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred to as such, in one example.

Figure 1:
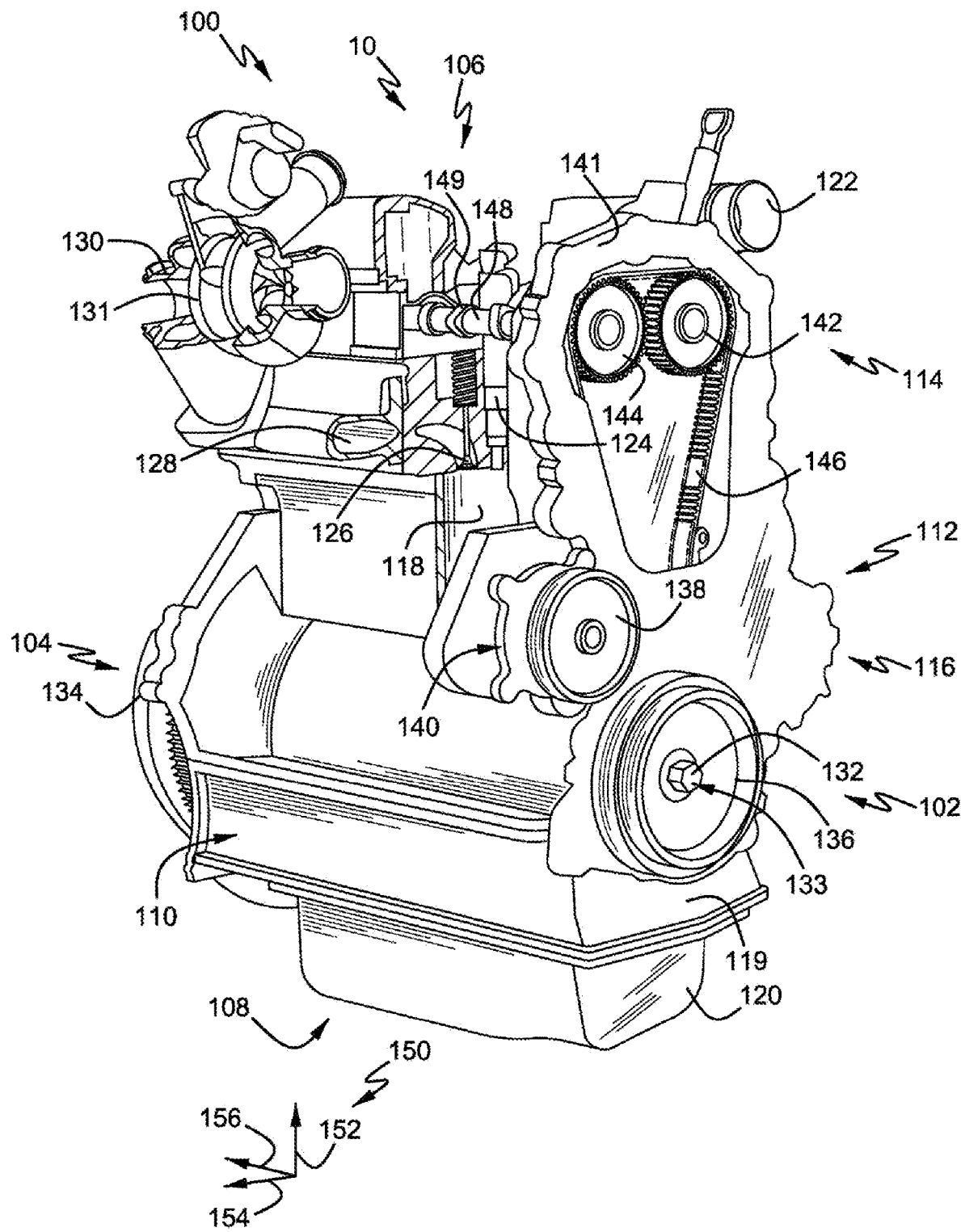
FIG. 1 shows a front perspective view of an example engine system, in accordance with one or more embodiments of the present disclosure.

Beginning with FIG. 1, it shows a front perspective view 100 of an example engine system 10. The engine system 10 may include a front end 102 opposite a back end 104, a top 106 opposite a bottom 108, and a first side 110 opposite a second side 112. The engine system 10 includes a cylinder head 114 coupled to a cylinder block 116, forming one or more combustion chambers 118 (which may be referred to herein as cylinders). Specifically, the combustion chambers 118 may be formed via one or more bores in the cylinder block 116, where the bores define the side and bottom walls of the combustion chambers 118. The cylinder head 114 may be positioned vertically above the cylinder block 116, and a bottom surface of the cylinder head 114 that interfaces with a top surface of the cylinder block 116 may define the top wall of the combustion chambers 118. In the examples described herein with reference to FIGS. 1-18, the engine system 10 includes four combustion chambers 118. However, it should be appreciated that in other examples, the engine system 10 may include more or less than four combustion chambers 118. Further, in the description herein, combustion chambers 118 may also be referred to herein as cylinders 118.

The cylinders 118 may be arranged adjacent and/or parallel to one another along the longitudinal axis 156, in what is commonly referred to by those skilled in the art as "inline" arrangement. Thus, the cylinders 118 may be arranged as a single row of cylinders. However, it should be appreciated that in other examples, the engine cylinders 118 may be arranged in multiple rows such as in a "V" type configuration.

A crankcase skirt 119 may be positioned below the cylinder block 116, between the cylinder block 116 and an oil pan 120. Thus, the crankcase skirt 119 may be coupled to the bottom of the cylinder block 116, and the oil pan 120 may be coupled to the bottom of the crankcase skirt 119. As such, the oil pan 120 may define the bottom 108 of the engine system 10. Said another way, the oil pan 120 may be positioned at the bottom 108 of the engine system 10. The oil pan 120 may house an oil pump (not shown in FIG. 1) which pumps oil to various rotating engine components for lubrication thereof.

Intake air may enter the engine system 10 via an intake conduit 122. The intake air may then be routed to the combustion chambers 118 via an integrated intake manifold 422 (shown by FIG. 4, FIG. 8, and FIG. 13 and described below in further detail below with reference to FIG. 13). In particular, an amount of airflow to the combustion chambers 118 may be regulated by an intake throttle and/or one or more intake valves. Upon opening of the one or more intake valves, the intake air may be introduced into the combustion chambers 118, such as during an intake stroke of a piston. The intake air may then be compressed during a compression stroke of the piston as the piston translates upwards towards the cylinder head 114 and top dead center (TDC) position. Diesel fuel may be injected into each of the combustion chambers 118 via respective fuel injectors 124 positioned above the combustion chambers 118. In particular, diesel fuel may be injected directly into each of the cylinders 118 by the fuel injectors 124. The injected fuel may combust with the compressed intake air during a subsequent power stroke. After combustion, one or more exhaust valves 126 may open to permit the products of combustion to exit the combustion chambers 118 to an exhaust manifold 128.

The exhaust manifold 128 may couple the combustion chambers 118 to a common exhaust passage 130 for routing the products of combustion from the combustion chambers 118 to the exhaust passage 130. One or more of the combustion chambers 118 may be additionally coupled to an internal exhaust passage 902 formed by interior surfaces of the cylinder head 114 in order to route exhaust gases to an EGR assembly 900 coupled to the engine system 10 (as shown by FIG. 9 and described in further detail below). The exhaust passage 130 may include a turbine 131 of a turbocharger of the engine system 10. The turbine 131 may be coupled to an intake compressor positioned in the intake conduit 122 for compressing the intake air delivered to the combustion chambers 118. After flowing through the turbine 131, exhaust gasses may pass through a diesel particular filter and/or other emissions control devices before being emitted to the environment.

Combustion of the air-fuel mixture in the combustion chambers 118 may drive translational movement of the pistons positioned within the combustion chambers 118. Movement of the pistons may be converted into rotational motion of a crankshaft 132 which may be used to provide torque to one or more vehicle wheels. In particular, a flywheel 134 may be coupled to a rear, second end of the crankshaft 132, opposite a front, first end 133 of the crankshaft 132, at the back end 104 of the engine system 10, as shown below with reference to FIG. 2. The front, first end 133 of the crankshaft 132 may be positioned at or proximate to the front end 102 of the engine system 10, and may include one or more gears and/or pulleys for driving various components of the engine system 10. For example, as shown in FIG. 1, the crankshaft 132 may include one or more outer first pulleys 136. One of the outer first pulleys 136 may be coupled to a water pump pulley 138 via a belt or chain for powering a water pump 140 of the engine system 10. In particular the water pump pulley 138 may be coupled to the water pump 140, such that rotational motion of the pulley 138 powers the water pump 140. The outer first pulleys 136 may include additional pulleys which may be coupled via belts and/or chains to various other engine components such as an A/C compressor to transfer power from the crankshaft thereto. The water pump 140 may supply water or coolant to one or more of the cylinder head 114, cylinder block 116, and a radiator to cool various components of the engine system 10.

The engine system 10 may include a front cover 141 at the front end 102 that protects and covers interior components of the engine system 10 at the front end 102. The outer first pulleys 136 and water pump pulley 138 are shown positioned in front of, or exterior to, the front cover 141. Interior to the front cover 141, and as described below in greater detail with reference to FIGS. 4-8, the crankshaft 132 may be coupled to one or more gears and/or belts to drive rotational motion of an intake camshaft pulley 142 and an exhaust camshaft pulley 144. The pulleys 142 and 144 may be positioned adjacent to one another at or proximate the top 106 of the front end 102 of the engine system 10 relative to the vertical axis 152. Further, the crankshaft 132 may include a gear at the front, first end 133 that may be in meshing engagement with an idler gear (described below with reference to FIGS. 4-8), the idler gear including a pulley coupled to the camshaft pulleys 142 and 144 via a camshaft drive belt 146. The idler gear may be positioned behind and interior to the outer first pulleys 136 relative to the front end 102. The camshaft pulleys 142 and 144 may be coupled to separate camshafts. In the example of FIG. 1, only an exhaust camshaft 148 is shown. The camshafts may thus rotate with the camshaft pulleys 142 and 144, and may regulate the opening and closing timing of the intake and exhaust valves. In particular, the intake camshaft pulley 142 may be coupled to an intake camshaft along the same rotational axis as the intake camshaft and may regulate the opening and closing times of one or more intake valves. Similarly, the exhaust camshaft pulley 144 may be coupled to an exhaust camshaft along the same rotational axis as the exhaust camshaft pulley 144 and may regulate opening and closing times of the exhaust valves 126. Thus, the exhaust camshaft may rotate at approximately the same rotational speed as the exhaust camshaft pulley 144, and the intake camshaft may rotate at approximately the same rotational speed as the intake camshaft pulley 142. The camshaft 148 may include camshaft lobes 149 which translate rotational motion of the camshaft 148 into linear motion of the exhaust valves.

As shown in the example of FIG. 1, the camshaft 148 may be positioned vertically above the cylinder block 116 in the cylinder head 114. As such, the camshaft 148 may be positioned vertically above the crankshaft 132. Although only two camshafts are shown in the example of FIG. 1, it should be appreciated that more or less than two camshafts may be included in other examples. Further, in some examples, the engine system 10 may include a variable valve timing system or variable cam timing system to adjust valve opening and/or closing times.

Figure 2:
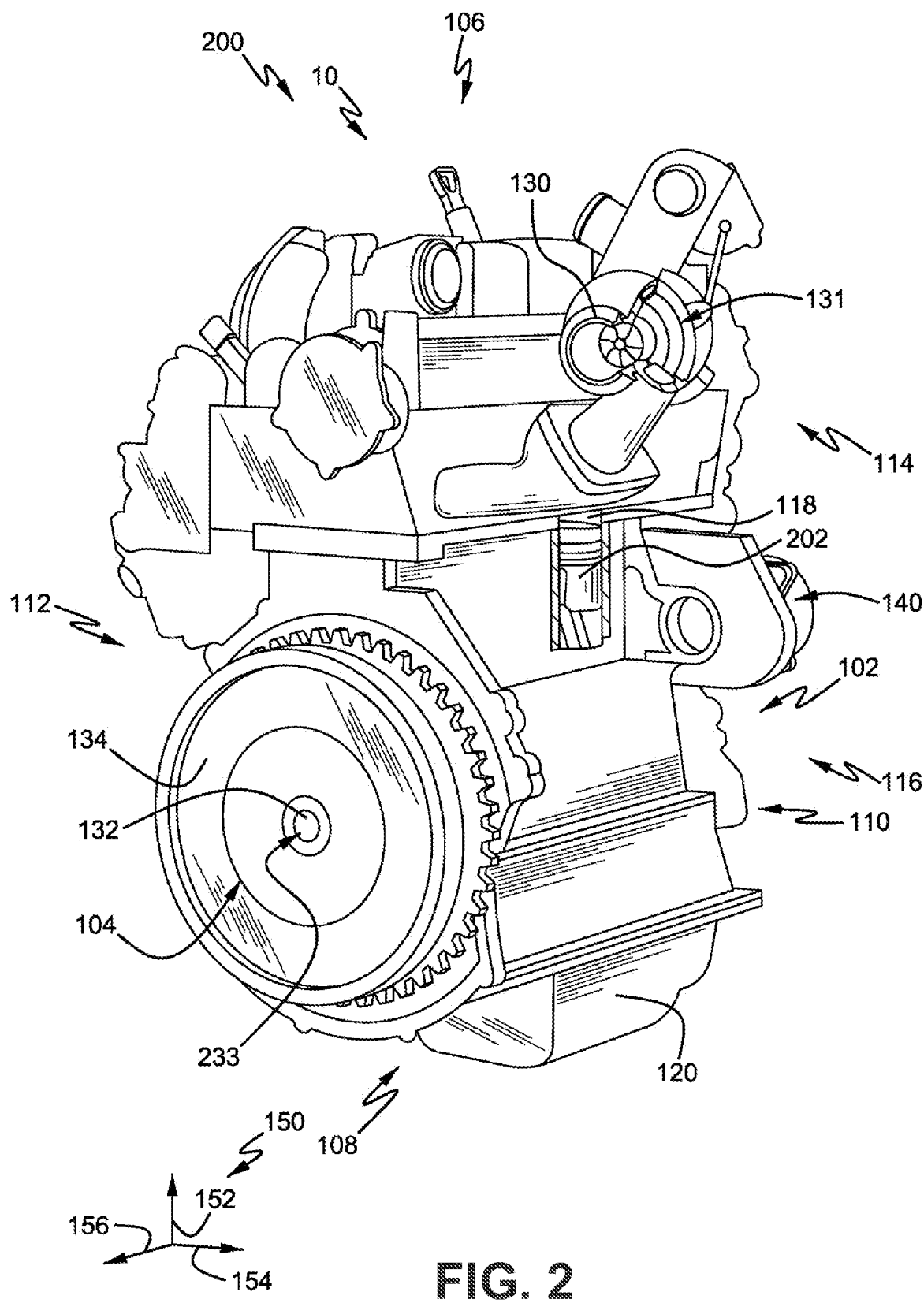
FIG. 2 shows a rear perspective view of the example engine system of FIG. 1, in accordance with one or more embodiments of the present disclosure.

Moving on to FIG. 2, it shows a back perspective view 200 of the engine system 10. Specifically, FIG. 2 shows a more detailed view of the back end 104 of the engine system 10, including the flywheel 134. The flywheel 134 may be coupled to the crankshaft 132 at a rear, second end 233 of the crankshaft 132, the rear, second end 233 opposite the front, first end 133 (not shown in FIG. 2). Thus, the flywheel 134 may be coupled to the crankshaft 132 at the back end 104 of the engine system 10. The flywheel 134 may couple the crankshaft 132 to a vehicle transmission, for transmitting torque from the crankshaft 132 to the transmission and one or more vehicle wheels.

FIG. 2 also shows an example of one or more pistons 202 positioned within one of the combustion chambers 118. The pistons 202 may translate up and down along the vertical axis 152 between TDC and bottom dead center (BDC) positions.

Figure 3:
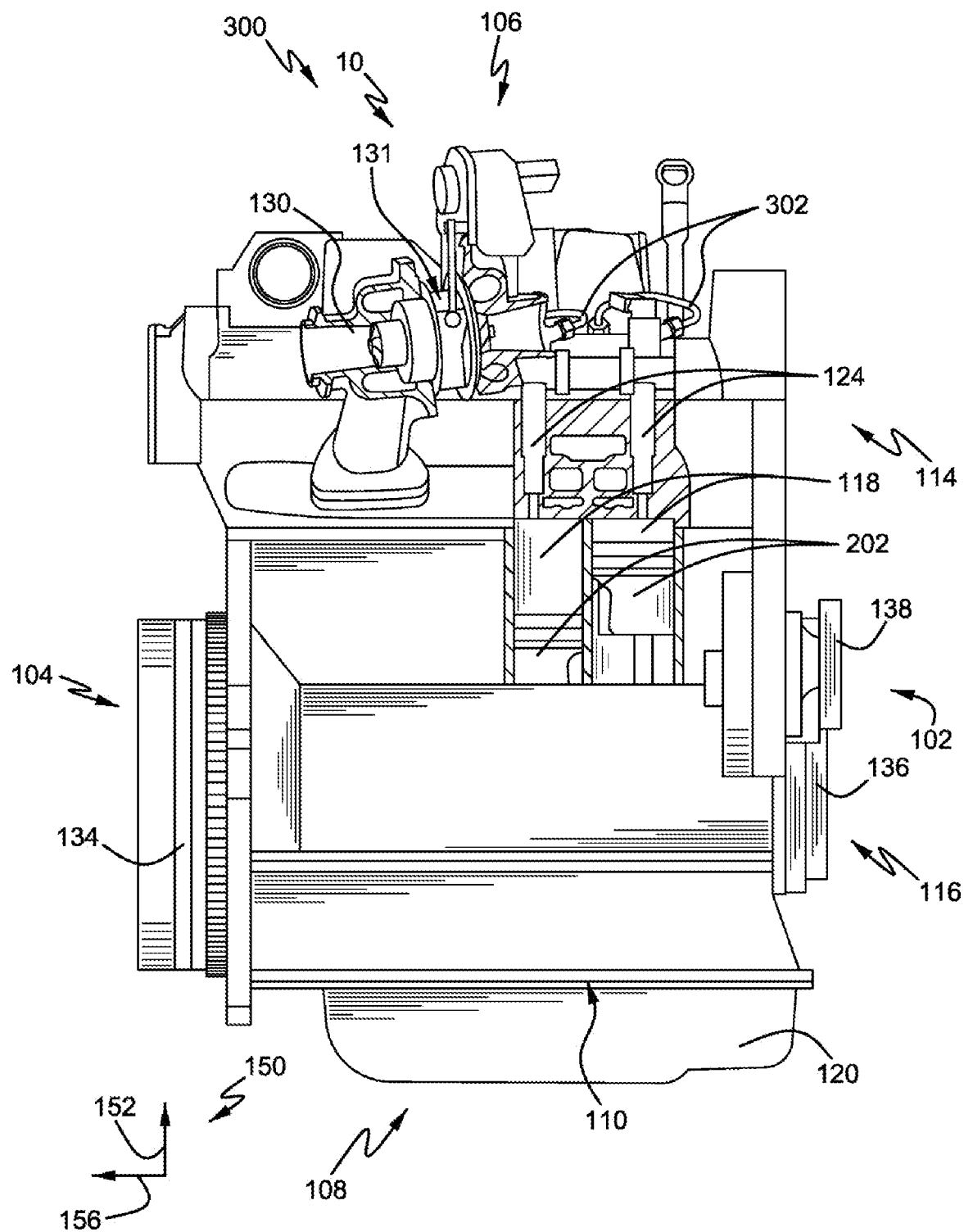
FIG. 3 shows a side view of the example engine system of FIG. 1, in accordance with one or more embodiments of the present disclosure.

Continuing to FIG. 3, it shows a first side view 300 of the engine system 10 facing the first side 110 of the engine system 10. Cutaways of two of the combustion chambers 118 are shown, exposing two of the pistons 202 positioned therein. Further, the fuel injectors 124 are shown positioned above the combustion chambers 118, such that each of the combustion chambers 118 includes a dedicated fuel injector. The fuel injectors 124 may be coupled to a fuel pump via fuel supply lines 302. Thus, the fuel supply lines 302 may be coupled to the fuel injectors 124 on a first end, and on an opposite second end to a fuel pump (not shown in FIG. 3).

Figure 4:
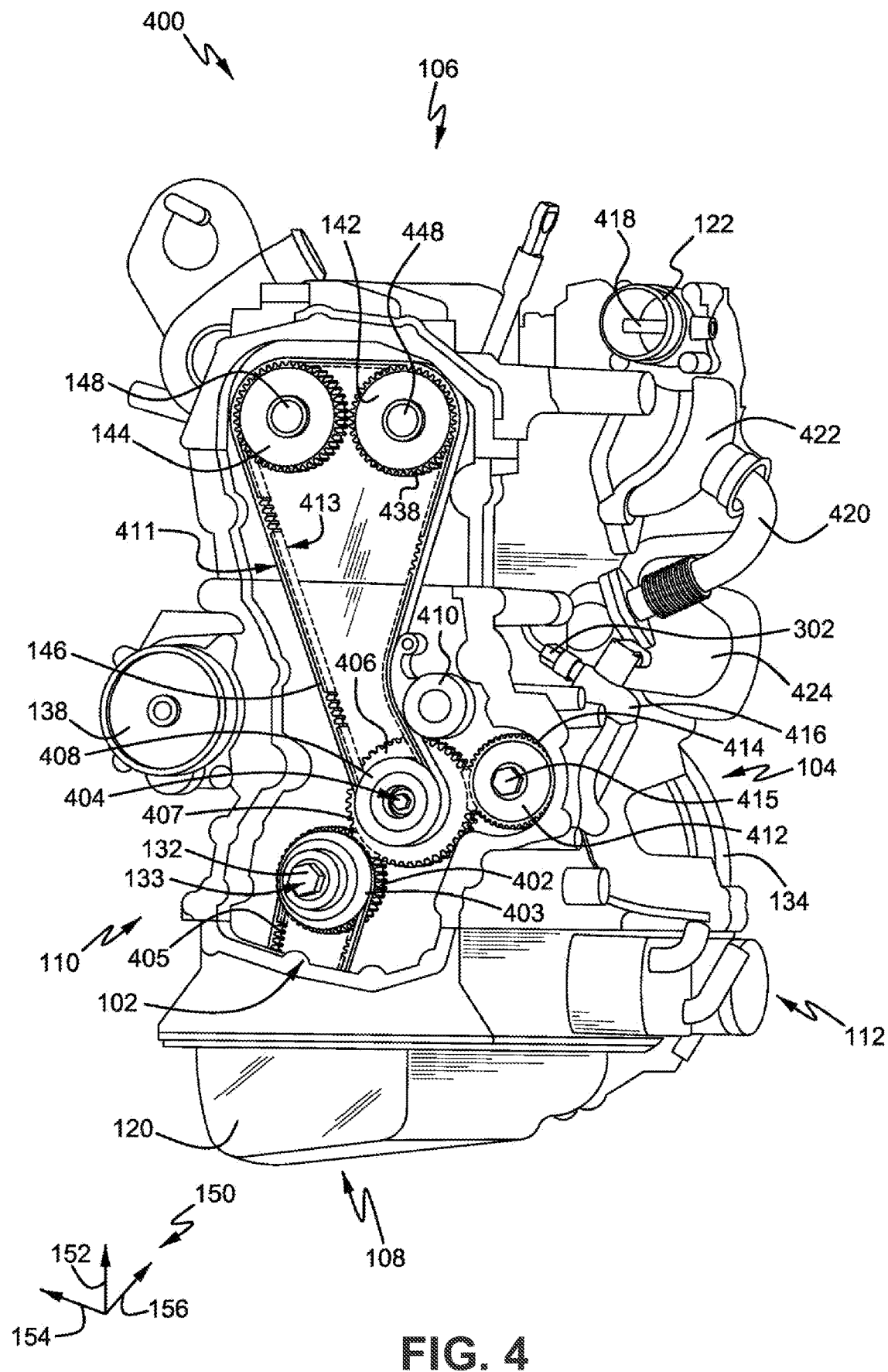
FIG. 4 shows a cross-sectional perspective view of a front end of the example engine system of FIG. 1, including a gear driven diesel fuel injection pump, in accordance with one or more embodiments of the present disclosure.
Figure 5:
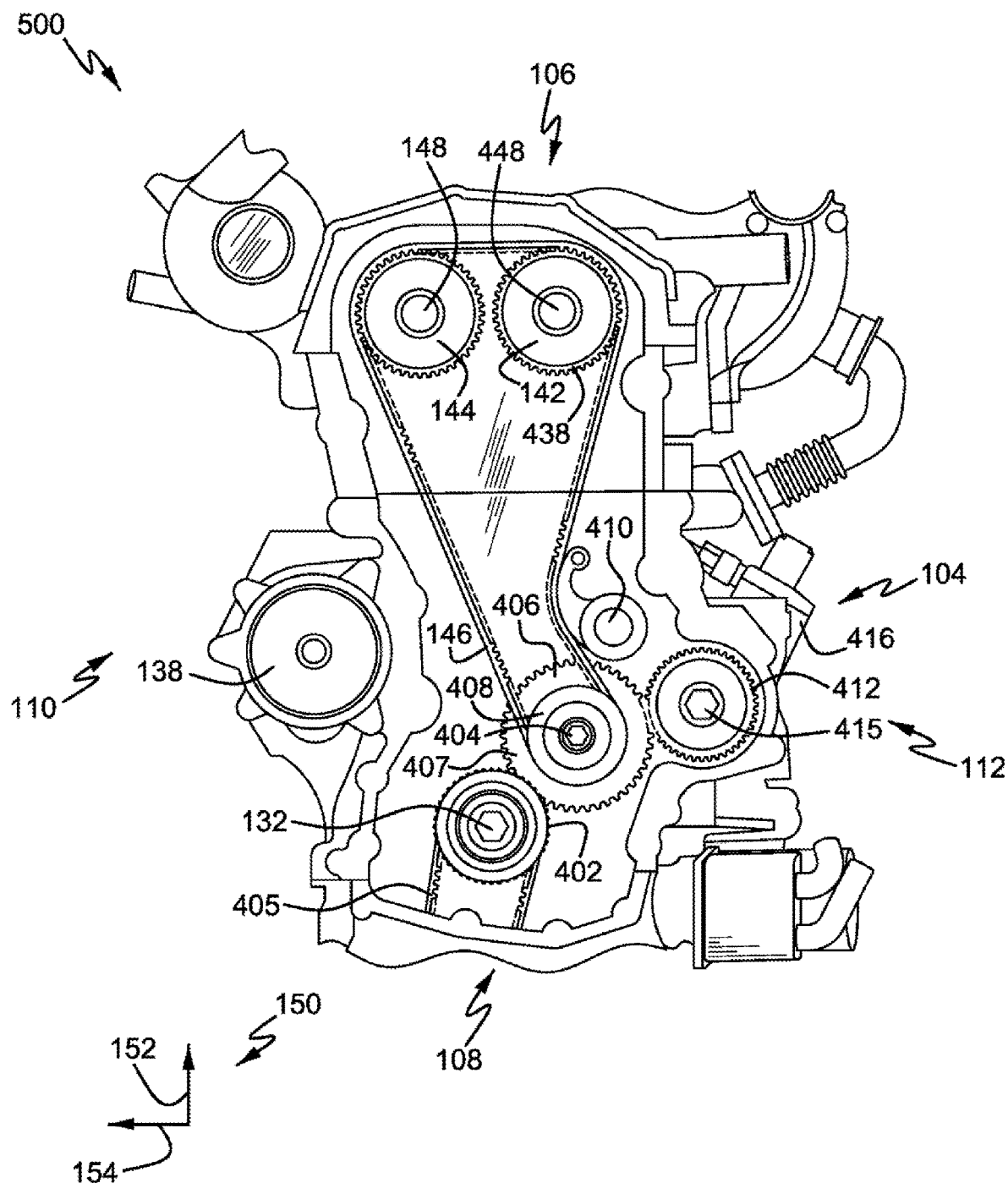
FIG. 5 shows a cross-sectional view of a front end of the example engine system of FIG. 1, including the gear driven diesel fuel injection pump of FIG. 4, in accordance with one or more embodiments of the present disclosure.

Turning now to FIGS. 4 and 5, they show cross-sectional views 400 and 500 respectively, of the engine system 10 at the front end 102 of the engine system 10, where the front cover 141 (described above with reference to FIG. 1) is removed. Thus, FIGS. 4 and 5 may be described together in the description herein. Thus, the cross-section of the engine system 10 shown in FIG. 4 is taken at the front end 102 of the engine system 10 along a plane parallel to the plane defined by the vertical axis 152 and lateral axis 154. The front cover 141 has been removed, exposing interior components of the engine system 10 at the front end 102 of the engine system 10. Thus, the components of the engine system 10 shown in FIG. 4, may be immediately adjacent and interior to the front cover 141 and outer first pulleys 136 described above with reference to FIGS. 1 and 3.

The first end 133 of the crankshaft 132 may include one or more of a crankshaft gear 402 and an oil pump pulley 403. The crankshaft gear 402 and oil pump pulley 403 may be coupled to the crankshaft 132 and may share a rotational axis with the crankshaft 132. In particular, the pulley 403 and gear 402 may be rotationally fixed relative to the crankshaft 132. The oil pump pulley 403 may also be referred to herein as oil pump drive gear 403. Thus, the pulley 403 and gear 402 may rotate with and at substantially the same angular velocity as the crankshaft 132. Thus, the oil pump pulley 403 and crankshaft gear 402 may be concentrically positioned around a central rotational axis of the crankshaft 132. The crankshaft gear 402 may be coupled to an idler gear assembly 404. The oil pump pulley 403 may be coupled to an oil pump (not shown in FIG. 4) positioned in the oil pan 120 via oil pump belt 405. Thus, rotational motion of the crankshaft 132 may be transferred to the oil pump via belt 405 to drive and power the oil pump.

The crankshaft gear 402 may drive the idler gear assembly 404 via meshing engagement between a plurality of teeth of the crankshaft gear 402, and a plurality of teeth 407 of the idler gear assembly 404. In particular, the idler gear assembly 404 may include an idler gear 406 and idler pulley 408, where the idler gear 406 includes the teeth 407. Thus, the idler gear 406 is in meshing engagement with the first end 133 of the crankshaft 132. The idler gear 406 and idler pulley 408 may integrally form the idler gear assembly 404. Thus, in some examples the idler gear assembly 404 may comprise a single continuous piece that includes the idler gear 406 and idler pulley 408. The idler gear 406, idler pulley 408, and idler gear assembly 404 may thus share a common rotational axis. Further, the idler gear 406, idler pulley 408, and idler gear assembly 404 may be rotationally fixed with one another, such that they rotate in the same direction and at substantially the same angular velocity. The idler gear 406 may have a larger diameter than the idler pulley 408. Thus, for a given angular velocity of the idler gear assembly 404, the edges or teeth 407 of the idler gear 406 may have a greater linear speed than the edges of the pulley 408, due to the larger diameter of the idler gear 406.

As the crankshaft 132 and thus crankshaft gear 402 rotate, the meshing teeth of the crankshaft gear 402 and idler gear 406 may cause the idler gear assembly 404 to rotate. Thus, the idler gear assembly 404 may be driven by the turning crankshaft 132 via meshing engagement of the teeth of the idler gear 406 and crankshaft gear 402. The idler gear assembly 404 may rotate in a direction opposite that of the crankshaft 132. Thus, the crankshaft 132 may rotate in a first direction, and the idler gear assembly 404 rotates in a second direction, the second direction opposite the first direction. For example, if the crankshaft 132 rotates in a counter-clockwise direction as viewed from the front end 102 of the engine system 10, the idler gear assembly 404 rotates in the clockwise direction.

Further, the idler gear 406 and idler gear assembly 404 may rotate at a slower rate (smaller angular velocity) than the crankshaft gear 402 and crankshaft 132. In particular, the idler gear 406 may include more teeth than the crankshaft gear 402 and/or may comprise a larger diameter than the crankshaft gear 402, and thus may rotate more slowly than the crankshaft 132 when driven by the crankshaft gear 402. In one example, the idler gear 406 may include 63 teeth and the crankshaft gear 402 may include 45 teeth. In other examples, the idler gear 406 may include more or less than 63 teeth and/or the crankshaft gear 402 may include more or less than 45 teeth.

Further, in some examples, the spacing of the crankshaft gear teeth, and the idler gear teeth and/or the sizing of the teeth may be approximately the same to reduce slippage between the gears 402 and 406 and maintain meshing engagement between the two gears 402 and 406. Thus, in such examples, the idler gear 406 may have a larger diameter than the crankshaft gear 402 to accommodate its larger number of teeth. The idler gear 406 may additionally or alternatively be sized to separate the idler gear 406 and a fuel pump drive gear 412 with which it is also in meshing engagement. Thus, the idler gear 406 may be sized based on one or more of a desired distance between the crankshaft gear 402 and the fuel pump drive gear 412, a desired number of teeth of teeth on the idler gear 406, a number of teeth on the crankshaft gear 402, a desired gear or speed ratio between the idler gear 406 and the crankshaft gear 402, etc.

However, in other examples, the crankshaft gear 402 may have a larger diameter than the idler gear 406. Further, in some examples, the spacing and/or sizing of the crankshaft gear teeth and idler gear teeth may be different. In yet further examples, the crankshaft gear 402 may comprise more teeth than the idler gear 406 and/or may rotate at a slower rate than the crankshaft gear 402.

The idler gear 406 may also be in meshing engagement with the fuel pump drive gear 412 via a plurality of interlocking teeth. Specifically, teeth 407 of the idler gear 406, and teeth 414 of the fuel pump drive gear 412 may be in meshing engagement such that rotational motion of the idler gear assembly 404 drives rotational motion of the fuel pump drive gear 412. The fuel pump drive gear 412 may be coupled to and may share a rotational axis with an input shaft 415 of a fuel pump 416. In some examples, the fuel pump drive gear 412 and the input shaft 415 may be rotationally fixed, such that they rotate at substantially the same angular velocity. The input shaft 415 may drive a piston or other pressurization element of the pump 416. In one example the pump 416 may include a single plunger (e.g., piston) as described below. However, in other examples, the pump 416 may include more than one plunger or pressurization element, and each plunger or pressurization element may be driven by the rotation of the input shaft 415.

Thus, rotational motion of the input shaft 415 may be used to power the pump 416, displace the piston of the pump 416, and thus pressurize fuel delivered to the combustion chamber 118 (not shown in FIG. 4). In some examples, the piston of the pump 416 may move linearly up and down (e.g., from a top-dead-center position to a bottom-dead-center position, and from the bottom-dead-center position to the top-dead-center position) twice for every one complete turn (e.g., 360 degree rotation) of the crankshaft 132. In this way, the crankshaft 132 may be used to power the pump 416. Specifically, rotational motion of the crankshaft 132 may be transferred to the input shaft 415 of the pump 416 via the idler gear 406 and fuel pump drive gear 412 to produce the linear motion of the piston within the pump 416.

Thus, the idler gear 406 and idler gear assembly 404 may be positioned between and may separate the crankshaft 132 and the fuel pump drive gear 412. Further, the idler gear assembly 404 may be positioned vertically above the crankshaft 132. Thus, the idler gear 406 may be in meshing engagement with the first end 133 of the crankshaft 132 and with the fuel pump drive gear 412 via the plurality of interlocking teeth. Further, the crankshaft 132, and in particular the crankshaft gear 402, may not be in meshing engagement with the fuel pump drive gear 412. Thus, the crankshaft gear 402, and fuel pump drive gear 412 may be separated by the idler gear 406. As such, the crankshaft 132 and fuel pump drive gear 412 may not be in physical contact with one another. However, torque may still be transmitted between the crankshaft 132 and the fuel pump drive gear 412 via the idler gear 406 (e.g., from the crankshaft 132 to the fuel pump drive gear 412 via the idler gear 406).

The fuel pump drive gear 412 may have approximately the same diameter and/or number of teeth as the crankshaft gear 402. Thus, in such examples, the fuel pump drive gear 412 may have a smaller diameter than the idler gear 406 and may include approximately 45 teeth. Further, the fuel pump drive gear 412 may rotate at approximately the same angular speed as the crankshaft 132. However, in other examples, the fuel pump drive gear 412 may have a larger or smaller diameter than the crankshaft gear 402, may include more or less teeth than the crankshaft gear 402, and/or may rotate at a different angular speed than the crankshaft 132. Further, the fuel pump drive gear 412 rotates in the opposite direction of the idler gear 406. Thus, the fuel pump drive gear 412 rotates in the same direction as the crankshaft 132.

In this way, side loading of the fuel pump input shaft 415 (e.g., forces against the fuel pump input shaft 415 in radial directions relative to a rotational axis of the fuel pump input shaft 415) and fuel pump bearings may be reduced relative to systems where belts and pulleys are used to couple the crankshaft 132 to the fuel pump input shaft 415, by including the idler gear 406 as a torque transferring mechanism between the crankshaft 132 and the fuel pump input shaft 415. Further, frictional losses incurred between fuel pump 416 and crankshaft 132 may be reduced relative to systems where belts and pulleys are used to couple the crankshaft 132 to the fuel pump input shaft 415 by coupling the crankshaft 132 to the fuel pump input shaft 415 via the idler gear assembly 404. As such, friction and wear on the fuel pump 416 may be reduced, and a longevity of the fuel pump 416 may be increased by reducing the load on one or more bearings of the fuel pump 416. Further still, a distance between the crankshaft 132 and the fuel pump 416 may be reduced by including the idler gear 406 relative to systems where belts and pulleys are used to couple the crankshaft 132 to the fuel pump 416, thus reducing the size, packaging, and cost of the engine system 10.

The camshaft drive belt 146 may be driven by the idler gear assembly 404. Specifically, the camshaft drive belt 146 may contact an outer circumferential surface of the idler pulley 408. Thus, the camshaft drive belt 146 may rotate as the idler gear assembly 404 rotates. In this way, the crankshaft 132 may drive the camshaft drive belt 146 via the idler gear assembly 404. Specifically, the crankshaft 132 drives rotation of the idler gear assembly 404 via meshing engagement between the first end 133 of the crankshaft 132 and the idler gear 406, and rotation of the idler gear 406 drives rotation of the camshaft drive belt 146 via pulley 408, with the pulley 408 directly coupled to the idler gear 406 such that rotating the idler gear 406 by a first amount of angle (e.g., degrees) rotates the pulley 408 by the same amount of angle. In this way, the crankshaft 132 may drive rotation of the idler gear assembly 404, and the idler gear assembly 404 may drive rotation of both the camshaft drive belt 146, and the fuel pump drive gear 412. However, the camshaft drive belt 146 may not contact (e.g., be in face-sharing contact with) the crankshaft 132.

The camshaft drive belt 146 may additionally couple to outer circumferential surfaces of the camshaft pulleys 142 and 144. Specifically, the camshaft pulleys 142 and 144 may include outer teeth 438 that may be in meshing engagement with the camshaft drive belt 146. In some examples, the pulleys 142 and 144 may include approximately 21 teeth each. However, in other examples, the pulleys 142 and 144 may each include more or less than 21 teeth. The number of teeth on the pulleys 142 and 144 and/or sizing of the pulleys 142 and 144 may be selected to achieve a 2:1 gear ratio between the crankshaft 132 and the pulleys 142 and 144, such that the pulleys 142 and 144 and camshafts complete one full rotation for every two full rotations of the crankshaft 132. A full rotation may be defined as 360 degrees of rotation. Thus, the camshafts and pulleys 142 and 144 may rotate 360 degrees for every 720 degrees that the crankshaft 132 rotates.

Thus, rotation of the idler gear assembly 404 via the rotating crankshaft 132 may drive rotation of the camshaft drive belt 146 which in turn may drive rotation of the camshaft pulleys 142 and 144. The camshaft pulleys 142 and 144 may share a rotational axis with the camshafts. In particular, the intake camshaft pulley 142 may share a rotational axis with an intake camshaft 448, and the exhaust camshaft pulley 144 may share a rotational axis with the exhaust camshaft 148. The intake camshaft pulley 142 may be rotationally fixed with the intake camshaft 448 such that the camshaft pulley 142 and camshaft 448 rotate at approximately the same angular velocity, and/or the exhaust camshaft pulley 144 may be rotationally fixed with the exhaust camshaft 148 such that the camshaft pulley 144 and camshaft 148 rotate at approximately the same angular velocity. However, in other examples, a variable valve timing system may be included to adjust the relative speed of the pulleys 142, and 144 and the camshafts 148, and 448 (e.g., increase or decrease a rotational speed of the camshaft 148 and/or camshaft 448 relative to a rotational speed of the pulley 142 and/or the pulley 144, respectively). As shown in the example of FIG. 4, the camshafts 148 and 448, and the camshaft pulleys 142 and 144 may be positioned vertically above the idler gear assembly 404.

In this way, the belt 146 may couple the idler gear assembly 404 to the camshaft pulleys 142 and 144. The belt 146 may be directly coupled to the idler pulley 408 and not coupled to the crankshaft 132. As such, rotational motion of the crankshaft 132 may be transmitted first to the idler gear assembly 404, and then from the idler gear assembly 404 to the camshaft pulleys 142 and 144 via the belt 146. The belt 146 may form a closed loop around the outer surfaces of the idler pulley 408 and the camshaft pulleys 142 and 144. As such, the linear speed of the camshaft pulleys 142 and 144 at the outer edges or teeth of the pulleys 142 and 144 may be approximately the same as the linear speed of the idler pulley 408 at the outer surface of the pulley 408. Further, the camshaft pulleys 142 and 144 may rotate in the same direction as the idler gear assembly 404 due to the rotating belt 146 coupling the pulleys 142 and 144 to the idler gear assembly 404. As such, the camshaft pulleys 142 and 144 may rotate in a direction opposite of the crankshaft. Thus, the crankshaft 132 may rotate in a first direction, and the idler gear assembly 404 and pulleys 142 and 144 rotate in a second direction, the second direction opposite the first direction. For example, if the crankshaft 132 rotates in a counter-clockwise direction as viewed from the front end 102 of the engine system 10, the pulleys 142 and 144 rotate in the clockwise direction.

The engine system 10 may further include a tensioner 410. As shown in the example of FIG. 4, the tensioner 410 may be positioned vertically above the idler gear assembly 404. The tensioner 410 may be rotatable, and may be biased to rotate in a direction via a biasing member (e.g., a spring). In the example of FIG. 4, the biasing member of the tensioner 410 may bias the tensioner 410 to rotate in a counterclockwise direction when viewed from the front end 102 of the engine system 10. As such, the tensioner 410 may exert a lateral force to the left (e.g., in the positive direction along the lateral axis 154) against the belt 146, and the belt 146 may correspondingly exert a normal force against the tensioner 410 in a direction opposite to the lateral force (e.g., to the right and in the negative direction along the lateral axis 154). The lateral force against the belt 146 from the tensioner 410 may tighten the belt 146 against the pulley 142, the pulley 144, and the idler pulley 408. In this way, the tensioner 410 may maintain tension in the belt 146 to an approximately constant amount. The tensioner 410 may contact an exterior first surface 411 of the belt 146, while the pulleys 142 and 144, and the idler pulley 408 may contact an opposite interior second surface 413 of the belt 146.

Due to its larger diameter and/or greater number of teeth relative to the crankshaft gear 402, the idler gear 406 may rotate at a smaller angular velocity than the crankshaft 132. As such, when coupled to the idler gear assembly 404, the belt 146 may rotate at a lower speed than it would when coupled to the crankshaft 132. Because the speed of the belt 146 may be reduced, the diameter of the camshaft pulleys 142 and 144 may be reduced in the embodiment of the engine system shown in FIG. 4, relative to engine systems where the camshaft belt is directly coupled to the crankshaft 132, to achieve a desired angular velocity ratio between the crankshaft 132 and the camshaft pulleys 142 and 144. For example, the desired angular velocity ratio between the crankshaft 132 and the camshaft pulleys 142 and 144 may be approximately 2:1, such that the camshaft pulleys 142 and 144 and camshafts 148 and 448 complete approximately one complete rotation for every two complete rotations of the crankshaft 132. However, it should be appreciated that the desired angular velocity ratio may be greater or less than 2:1 in other examples. By reducing the diameter of the camshaft pulleys 142 and 144, the overall size, packaging, and cost of the engine system 10 may be reduced relative to system where the camshaft belt is directly coupled to the crankshaft 132. In some examples, the diameters of the camshaft pulleys 142 and 144 may be approximately the same. However, in other examples, the diameters of the camshafts pulleys 142 and 144 may be different.

The engine system 10 may further include an exhaust gas recirculation (EGR) system as shown by FIGS. 9-12 and described below. In particular, the engine system 10 may include a high-pressure exhaust gas recirculation system, where an exhaust gases flow through an exhaust passage formed within an interior of the cylinder head, through an EGR assembly and EGR cooler, and to a location downstream of the compressor of the turbocharger in the intake conduit 122. Additionally or alternatively, the engine system 10 may include a low-pressure EGR system where a LP-EGR passage couples the exhaust passage downstream of the turbine of the turbocharger to a location upstream of the compressor of the turbocharger in the intake conduit 122. In this way, exhaust gases may be recirculated to the intake conduit 122. Intake conduit 122 is shown in FIG. 4 to include an intake throttle 418 which may regulate an amount of air flowing into the engine system 10.

EGR passage 420 may couple an EGR cooler 424 to the engine intake. Specifically, in examples where the EGR system is configured as an HP-EGR system, such as in the example of shown by FIG. 4 and FIGS. 9-12, the EGR passage 420 may be coupled to the intake manifold 422. The intake manifold 422 may be an integrated intake manifold 422. The intake manifold 422 routes intake gasses from the intake conduit 122 to each of the combustion chambers 118 (not shown in FIG. 4). The EGR system includes EGR cooler 424 for cooling exhaust gases that are recirculated to the intake manifold 422. Specifically, the EGR cooler 424 may be positioned upstream of the EGR passage 420 for cooling the exhaust gasses en route to the intake manifold 422.

Figure 6:
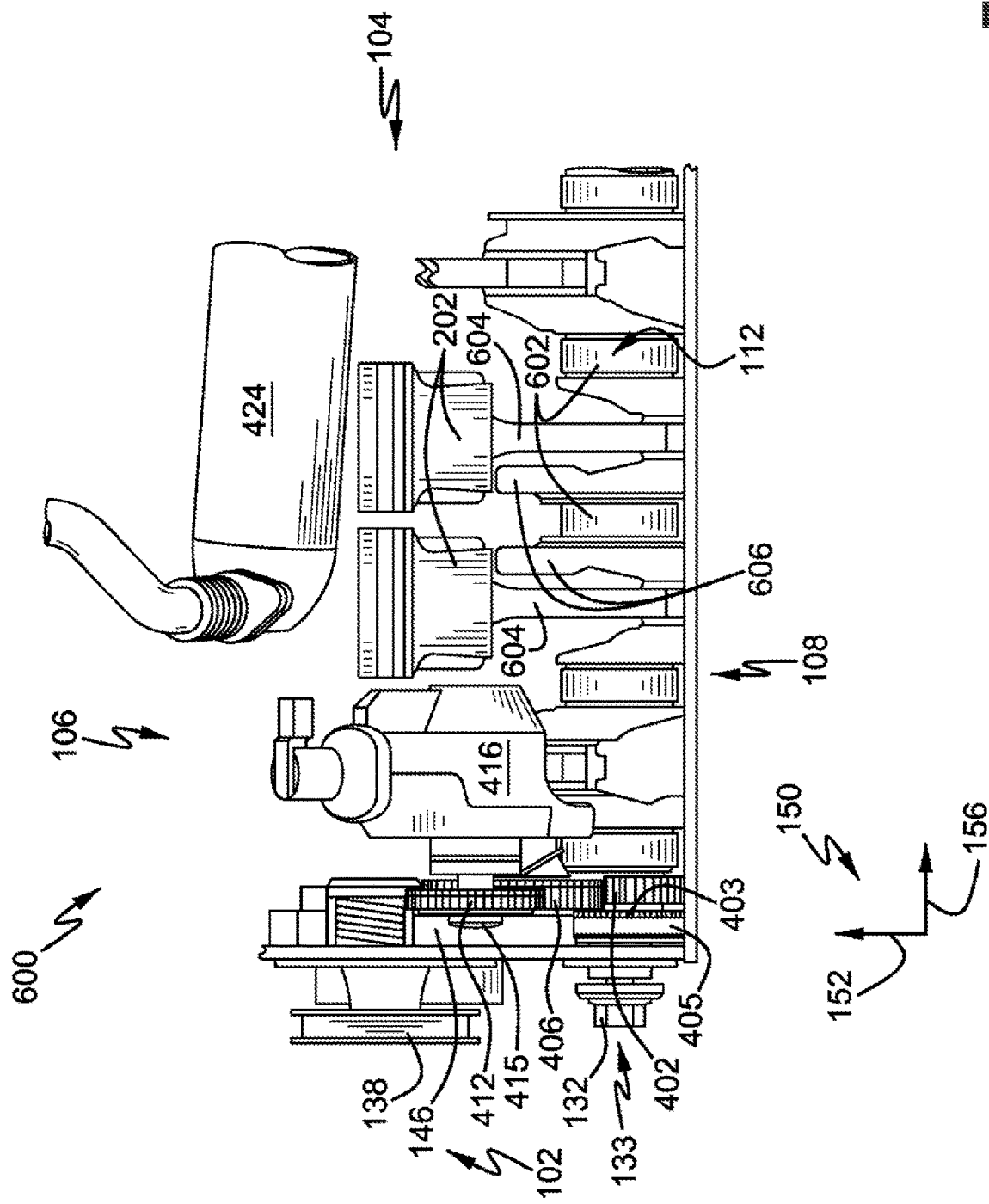
FIG. 6 shows a cross-sectional view of a side of the example engine system of FIG. 1, including the gear driven diesel fuel injection pump of FIGS. 4-5, in accordance with one or more embodiments of the present disclosure.

Turning now to FIG. 6, it shows a side cross-sectional view 600 of the engine system 10 at the second side 112 of the engine system 10. Thus, the cross-section of the engine system 10 shown in FIG. 6 is taken at the second side 112 of the engine system 10 along a plane parallel to the plane defined by the vertical axis 152 and longitudinal axis 156. As such, interior components of the engine system 10 at the second side 112 of the engine system 10 are exposed (e.g., shown) in FIG. 6.

As depicted in FIG. 6, the water pump pulley 138 may be positioned in front of (e.g., in the negative direction of the longitudinal axis 156 from the crankshaft gear 402) the crankshaft gear 402, oil pump belt 405 and oil pump pulley 403, etc. Further, the oil pump belt 405 and oil pump pulley 403 may be positioned in front of and adjacent to the crankshaft gear 402. Thus, the crankshaft gear 402 may be positioned behind the oil pump belt 405, oil pump pulley 403, and water pump pulley 138. However, the crankshaft gear 402, idler gear 406, and fuel pump drive gear 412 may be aligned with each other along the longitudinal axis 156. Thus, the crankshaft gear 402, idler gear 406, and fuel pump drive gear 412 may be positioned parallel to each other along a same plane, with the plane being parallel to a plane defined by the vertical axis 152 and lateral axis 154. Thus, the rotational axes of the fuel pump drive gear 412, crankshaft gear 402, and idler gear 406 may be parallel to one another (e.g., may extend in a same direction). By positioning the gears 402, 412, and 406 in the same plane, the length of the engine system 10 with respect to the longitudinal axis 156 may be reduced relative to systems where the pump 416 is driven by a belt or chain. As such, the size, packaging and/or cost of the engine system 10 may be reduced.

Further, as depicted in FIG. 6, the fuel pump drive gear 412 and fuel pump 416 may be positioned vertically above the crankshaft 132. Additionally or alternatively, the fuel pump 416 may be positioned behind the first end 133 of the crankshaft 132, and/or behind the crankshaft gear 402, idler gear 406, and fuel pump drive gear 412. Further, the fuel pump 416 may be positioned below the intake manifold 422 (shown and described above with reference to FIG. 4), and below the camshaft pulleys 142 and 144. The fuel pump 416 may be positioned below the EGR cooler 424.

Further, as depicted in FIG. 6, the idler pulley 408 (obscured from view in FIG. 6 by the camshaft drive belt 146 which is positioned over the idler pulley 408), oil pump pulley 403, oil pump belt 405, and camshaft drive belt 146 are all aligned along a same plane at the front end 102 of the engine system 10. Thus, the idler pulley 408, oil pump pulley 403, oil pump belt 405, and camshaft drive belt 146 may be positioned parallel to each other along the same plane, where the plane is parallel to a plane defined by the vertical axis 152 and lateral axis 154. Said another way, the idler pulley 408, oil pump pulley 403, oil pump belt 405, and camshaft drive belt 146 may be positioned at a same position along the longitudinal axis 156. Further, the rotational axes of the idler pulley 408, oil pump pulley 403, oil pump belt 405, and camshaft drive belt 146 may be parallel to one another.

FIG. 6 also shows two of the pistons 202 coupled to the crankshaft 132 via respective connecting rods 604. The crankshaft 132 may include main journals 602, and counterweights 606. The counter weights 606 may reduce a magnitude of one or more vibrational modes of the crankshaft 132 (e.g., motions of the crankshaft 132 in different directions, at different frequencies, etc.) as the rotational motion of the crankshaft 132 is converted into linear motion of the pistons 202.

Figure 7:
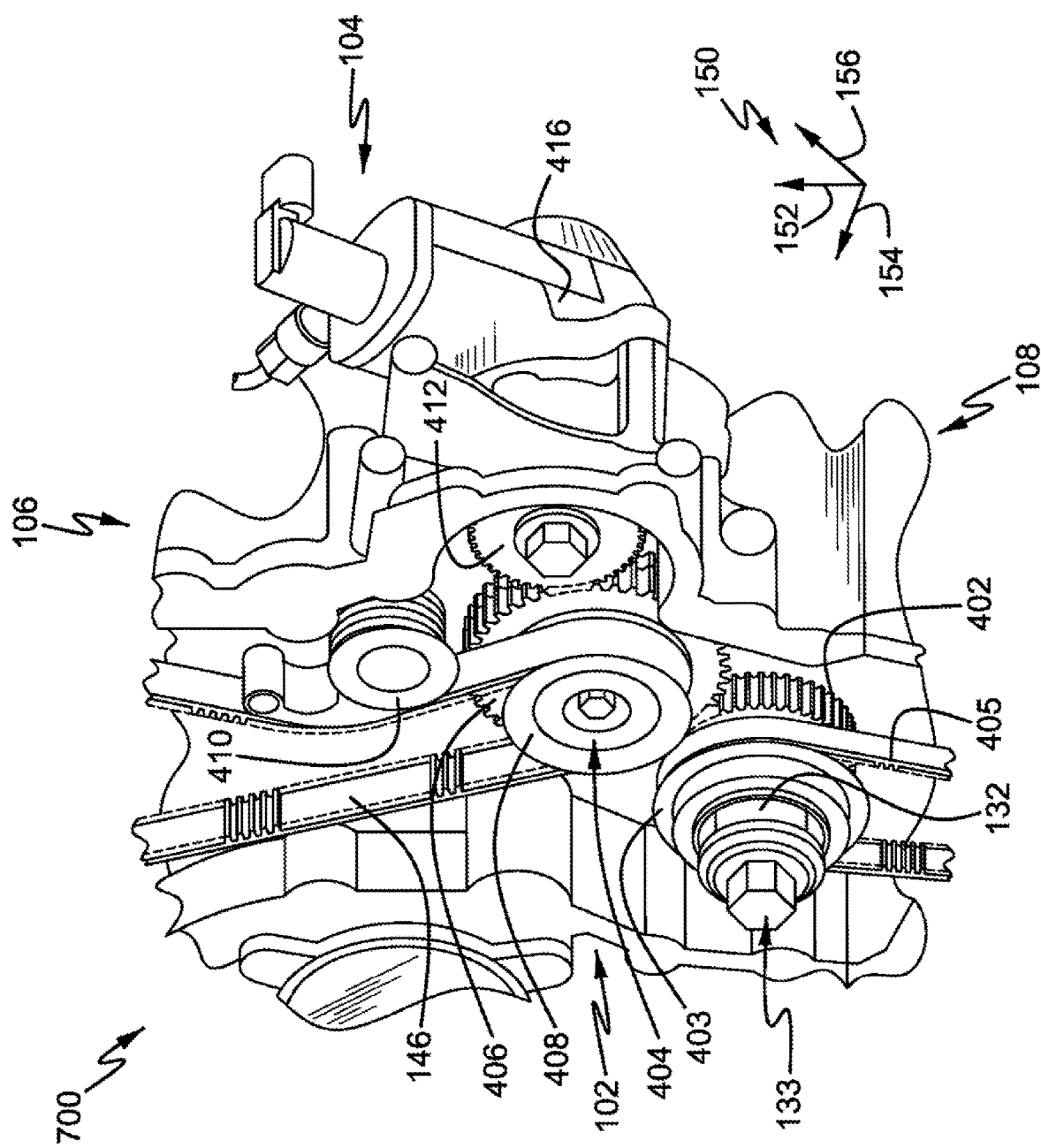
FIG. 7 shows a perspective view of the gear driven diesel fuel injection pump of FIGS. 4-6, in accordance with one or more embodiments of the present disclosure.
Figure 8:
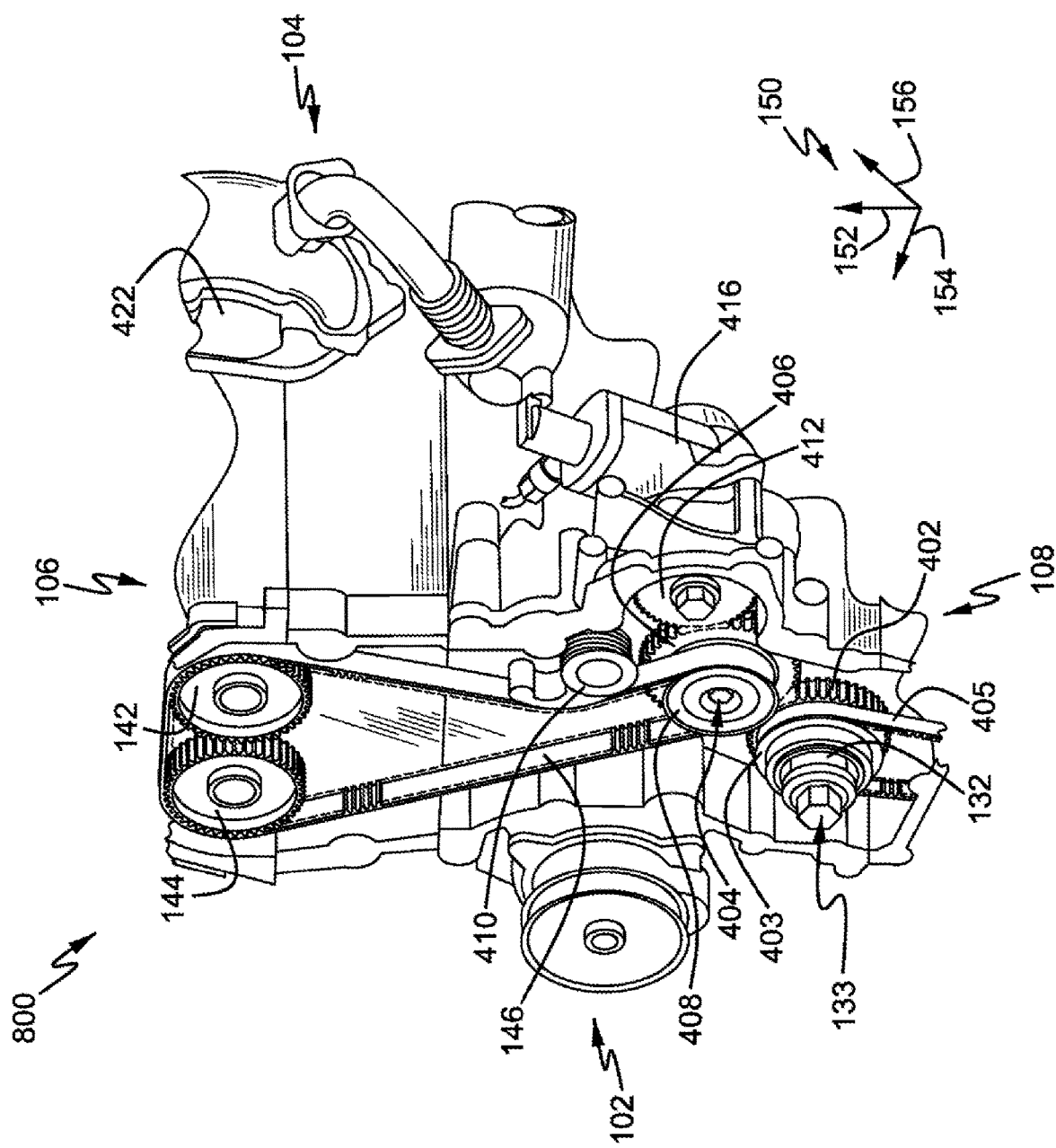
FIG. 8 shows a cross-sectional perspective view of the front end of the example engine system of FIG. 1, including the gear driven diesel fuel injection pump of FIGS. 4-7, in accordance with one or more embodiments of the present disclosure.

Turning now to FIGS. 7 and 8, they show side perspective views 700 and 800 respectively, of the front end 102 of the engine system 10. Thus, FIGS. 7 and 8 show the components at the front end 102 of the engine system 10 shown previously in FIGS. 4 and 5, where the front cover 141 has been removed, exposing interior components of the engine system 10 at the front end 102. As such, FIGS. 7 and 8 may be described together in the description herein.

As depicted in FIG. 8, the camshaft pulleys 142 and 144 may be positioned vertically above one or more of the fuel pump 416, idler gear assembly 404, tensioner 410, fuel pump drive gear 412, and crankshaft 132. Further, the idler pulley, oil pump pulley 403, oil pump belt 405, camshaft drive belt 146, and camshaft pulleys 142 and 144 are all arranged in a common plane at the front end 102 of the engine system 10. Thus, the idler pulley 408, oil pump pulley 403, oil pump belt 405, camshaft drive belt 146, and camshaft pulleys 142 and 144 may be positioned parallel to each other along a same plane, where the plane may be parallel to a plane defined by the vertical axis 152 and lateral axis 154. Said another way, the idler pulley 408, oil pump pulley 403, oil pump belt 405, camshaft drive belt 146, and camshaft pulleys 142 and 144 may be positioned at the same position along the longitudinal axis 156. Further, the rotational axes of the idler pulley 408, oil pump pulley 403, oil pump belt 405, camshaft drive belt 146, and camshaft pulleys 142 and 144 may be parallel to each other.

Further, the fuel pump 416 may be positioned below the intake manifold 422. In this way, by coupling the fuel pump 416 to the crankshaft 132 via a drive gear (e.g., idler gear 406), the distance between the fuel pump 416 and the crankshaft 132 may be reduced compared to examples where the fuel pump 416 is coupled to the crankshaft 132 via a belt or chain. As such, the fuel pump 416 may be positioned below the camshaft pulleys 142 and 144 instead of above the pulleys 142 and 144 as may be the case in examples where the fuel pump 416 is driven by a pulley or belt. As such, the height of the engine system 10 with respect to the vertical axis may be reduced by driving the fuel pump 416 via a drive gear (e.g., idler gear 406) relative to examples where the fuel pump 416 is driven by a belt.

FIG. 9 shows a cross-sectional view of the cylinder head 114 and illustrates a flow of exhaust gases and engine coolant through the cylinder head 114 toward an EGR assembly 900. Cylinder head 114 includes a plurality of passages formed within an interior of the cylinder head 114. Specifically, cylinder head 114 includes an internal exhaust passage 902 for flowing exhaust gases to EGR assembly 900 and an internal coolant passage 904 for flowing coolant to EGR assembly 900.

Internal exhaust passage 902 receives exhaust gases (e.g., combusted fuel and air) from one or more cylinders 118 and routes the exhaust gases through the cylinder head 114 toward EGR assembly 900. In the example of the engine system 10 described herein with reference to FIGS. 1-18, the exhaust manifold 128 is an external exhaust manifold coupled to the cylinder head 114 via fasteners (e.g., bolts) and configured to flow exhaust gases from a plurality of exhaust ports of the cylinders 118 toward an external exhaust outlet 1702 (e.g., external to the interior of the cylinder head 114 and shown by FIG. 17).

The internal exhaust passage 902 may be joined (e.g., formed together) with one or more of the exhaust ports internal to the cylinder head 114 such that a portion of exhaust gases flowing from the one or more exhaust ports does not flow through the exhaust manifold 128. Instead, the portion of exhaust gases described above may flow through the internal exhaust passage 902 toward the EGR assembly 900 as indicated by example exhaust flow path 916. In this configuration, the internal exhaust passage 902 receives the portion of exhaust gases directly from the exhaust ports of the cylinders 118. In other examples, exhaust gases may instead flow from one or more exhaust runners of the exhaust manifold 128 into the internal exhaust passage 902. In such examples, the internal exhaust passage 902 may form an exhaust inlet aperture (e.g., an opening) at an exterior surface of the cylinder head 114 (e.g., external to the interior of the cylinder head 114). The exhaust inlet aperture may be coupled to the one or more exhaust runners in order to flow exhaust gases from the exhaust runners, through the exhaust inlet aperture, and into the internal exhaust passage 902. In other examples, the exhaust manifold 128 may instead be an internal exhaust manifold (IEM) and may be included entirely within (e.g., formed within) the interior of the cylinder head 114. Specifically, the runners of the IEM may be formed by interior surfaces of the cylinder head 114 and may extend through the interior of the cylinder head 114 to couple to the exhaust ports of the cylinders 118. In such examples, the internal exhaust passage 902 may be joined with (e.g., formed together with) one or more of the exhaust runners in order to receive a portion of exhaust gases from one or more of the respective cylinders 118. In yet further examples, internal exhaust passage 902 may receive exhaust gases directly from a combination of the exhaust ports and the exhaust manifold (e.g., via the exhaust runners).

EGR assembly 900 includes an EGR valve 905 positioned within an interior 952 of a body 950 of the EGR assembly 900 and in a flow path (e.g., exhaust flow path 916) of exhaust gases from the internal exhaust passage 902. The EGR valve 905 is positioned downstream of an EGR inlet 906 formed by an exterior surface of the body 950, with the EGR inlet 906 of the body 950 directly coupled to an EGR outlet 910 of the cylinder head 114. The EGR valve 905 may be a normally closed valve and may be moved to an opened position, a closed position, and a plurality of positions between the opened position and closed position via a valve actuator (e.g., a solenoid, hydraulic actuator, etc.). By adjusting an amount of opening of the EGR valve 905, a flow rate of exhaust gases from the internal exhaust passage 902 through the EGR assembly 900 may be adjusted. For example, increasing the amount of opening may increase the flow rate of exhaust gases, and decreasing the amount of opening may decrease the flow rate of exhaust gases.

In one example, the position of the EGR valve 905 may be adjusted by an electronic controller (e.g., computer system) of the engine system 10. The controller receives signals from the various sensors of the engine system 10 and employs the various actuators of the engine system 10 to adjust engine operation based on the received signals and instructions stored on a memory of the controller. For example, adjusting a flow of exhaust gas through the EGR valve 905 may include adjusting an actuator of the EGR valve 905 to adjust an amount of opening of the EGR valve 905. In one example, the controller may determine a control signal to send to the valve actuator, such as an amplitude of the signal being determined based on a determination of the flow rate of exhaust gas through the EGR valve 905. The flow rate of exhaust gas through the EGR valve may be based on a measured flow rate, or determined based on operating conditions such as engine speed and/or a position of the EGR valve 905. The controller may determine the amplitude through a determination that directly takes into account the flow rate, such as increasing the amplitude to increase the flow rate (e.g., increase an amount of opening of the EGR valve 905). The controller may alternatively determine the amplitude based on a calculation using a look-up table with the input being flow rate and the output being signal amplitude.

The internal coolant passage 904 may be a coolant passage positioned in parallel or in series with other coolant passages formed within the cylinder head 114 by interior surfaces of the cylinder head 114. Coolant (e.g., engine coolant) may flow within the cylinder head 114 through the internal coolant passage 904 and toward the EGR assembly 900 as shown by example coolant flow path 914. The coolant flows from the internal coolant passage 904, through the body 950 of the EGR assembly 900, and into the EGR cooler 424. Exhaust gases and coolant do not mix or converge within the body 950 of the EGR assembly 900. The internal coolant passage 904 forms a coolant outlet 912 at an exterior surface of the cylinder head 114 and the coolant outlet 912 is fluidly coupled with a coolant inlet 908 of the EGR assembly 900. In the example shown by FIG. 9, the EGR assembly 900 is directly coupled to the exterior surface of the cylinder head 114 at the coolant outlet 912 and EGR outlet 910 such that no additional coolant or exhaust gas passages external to the cylinder head 114 are positioned between the coolant outlet 912 and coolant inlet 908 or between the EGR outlet 910 and EGR inlet 906. By directly coupling the EGR assembly 900 to the cylinder head 114 and routing exhaust gases and coolant through the cylinder head to the EGR assembly 900 in this way, an amount of coolant and/or exhaust gas passages external to the cylinder head 114 may be reduced and a size of the engine system 10 may be decreased.

The EGR assembly 900 is fluidly coupled to the EGR cooler 424 such that coolant flowing into the EGR assembly 900 (e.g., via coolant flow path 914) is routed into coolant passages of the EGR cooler 424, and exhaust gas flowing into the EGR assembly 900 (e.g., via exhaust flow path 916) is routed into a bypass passage and/or a collection volume of the EGR cooler 424 as described below with reference to FIGS. 10-12.

FIGS. 10-12 show different views of the EGR cooler 424. Specifically, FIG. 10 shows a view of an exterior of the EGR cooler 424 (e.g., exterior surfaces formed by a body 1044 of the EGR cooler 424), FIG. 11 shows a view of the EGR cooler 424 along a first cross-sectional plane parallel to the vertical axis 152 and lateral axis 154 and positioned at an inlet end 1042 of the EGR cooler 424, and FIG. 12 shows view of the EGR cooler 424 along a second cross-sectional plane parallel to the first cross-sectional plane and positioned at an outlet end 1040 of the EGR cooler 424. The inlet end 1042 and outlet end 1040 are positioned opposite to each other along a central axis 1030 of the EGR cooler 424. Exhaust gases may flow from the EGR assembly 900 coupled to the cylinder head 114 (as described above with reference to FIG. 9) into a collection volume 1100 formed by an interior 1046 of the body 1044 via an exhaust inlet 1104 positioned at the inlet end 1042. The exhaust gases may be cooled by heat transfer (e.g., transfer of thermal energy) from the exhaust gases to coolant (e.g., engine coolant) flowing through one or more coolant passages (not shown) surrounding a perimeter of the collection volume 1100. The coolant passages are formed within the interior 1046 of the body 1044 and are fluidly separated from the collection volume 1100 such that coolant and exhaust gases do not mix and/or converge within the EGR cooler 424.

Coolant may flow into the coolant passages of the EGR cooler via one or more coolant inlets position at the inlet end 1042 of the EGR cooler 424. In the example shown by FIGS. 10-12 and described herein, the inlet end 1042 includes a first coolant inlet 1002, a second coolant inlet 1004, and a third coolant inlet 1006 positioned radially around the central axis 1030 and the exterior of the EGR cooler 424. The coolant inlets (e.g., first coolant inlet 1002, second coolant inlet 1004, and third coolant inlet 1006) are fluidly coupled with the internal coolant passage 904 of the cylinder head 114 via the EGR assembly 900. The first coolant inlet 1002 is formed as an aperture within a first flange 1008 of the body 1044, the second coolant inlet 1004 is formed as an aperture within a second flange 1010 of the body 1044, and the third coolant inlet 1006 is formed as an aperture within a third flange 1012 of the body 1044. The first flange 1008, second flange 1010, and third flange 1012 are each directly coupled to the EGR assembly 900 via a plurality of fasteners 1014 (e.g., bolts) such that the first coolant inlet 1002, second coolant inlet 1004, and third coolant inlet 1006 are fluidly coupled to corresponding coolant outlets of the EGR assembly 900.

In an example, coolant flows from the internal coolant passage 904 of the cylinder head 114, into the EGR assembly 900, and into the coolant passages of the EGR cooler 424 via the coolant inlets described above. The coolant may absorb thermal energy from exhaust gases within the EGR cooler 424 and may then flow out of the EGR cooler 424 via a coolant outlet 1022 in order to be recirculated within the engine system 10 (e.g., cooled via a radiator fluidly coupled with the coolant outlet 1022 and/or pumped back into the cylinder head 114). In one example, coolant flowing out of the EGR cooler 424 via the coolant outlet 1022 may be routed via one or more external coolant passages to a heater core. Due to the direct coupling of the coolant inlets (e.g., first coolant inlet 1002, second coolant inlet 1004, and third coolant inlet 1006) to the body 950 of the EGR assembly 900, passages coupled to the coolant outlet 1022 are the only external coolant passages included by the engine system 10. By reducing the number of external coolant passages, an overall size of the engine system 10 may be reduced.

The EGR cooler 424 includes a bypass passage 1102 configured to route exhaust gases through the EGR cooler 424 and reduce an amount of thermal energy transferred from the exhaust gases to the coolant flowing through the coolant passages. The bypass passage 1102 extends from the inlet end 1042 to the outlet end 1040 within the interior 1046 of the EGR cooler 424 and is positioned away from the coolant passages of the EGR cooler 424. In this configuration, an amount of heat transferred from exhaust gas flowing through the bypass passage 1102 to the coolant may be decreased relative to an amount of heat transferred to the coolant via exhaust gas flowing within the collection volume 1100.

Exhaust gases flowing through the collection volume 1100 may flow out of the EGR cooler 424 via a first exhaust outlet 1016 and/or a second exhaust outlet 1020. The first exhaust outlet 1016 and/or second exhaust outlet 1020 may each be fluidly coupled to the intake manifold 422 (e.g., via EGR passage 420 coupled to first exhaust outlet 1016) in order to mix exhaust gases from the EGR cooler 424 with intake air flowing into the intake manifold 422 for delivery to the cylinders 118. Additionally, exhaust gases flowing through the bypass passage 1102 may flow out of the first exhaust outlet 1016. However, in order to direct a flow of exhaust gases from the bypass passage 1102 to the first exhaust outlet 1016, EGR cooler 424 includes a baffle 1200 surrounding a perimeter of the first exhaust outlet 1016 within the interior 1046 of the body 1044 of the EGR cooler 424. The baffle 1200 forms a partially-enclosed volume fluidly coupled to both of the bypass passage 1102 and the collection volume 1100 and is shaped to direct exhaust gases from the bypass passage 1102 toward the first exhaust outlet 1016. By directing the exhaust gases in this way via the baffle 1200, an amount of exhaust gas recirculating into the collection volume 1100 from the bypass passage 1102 may be reduced.

FIGS. 13-14 show different cross-sectional views of a plurality of intake runners included by the intake manifold 422. Specifically, FIG. 13 shows a cross-sectional view of the intake manifold 422 illustrating a relative positioning of helical intake runners and non-helical intake runners of the intake manifold 422, and FIG. 14 shows a cross-sectional view of the intake runners coupled to intake ports of two cylinders 118 of the engine system 10. A main intake inlet 1316 of the intake manifold 422 is positioned along a central axis 1390 of the intake manifold 422 and is fluidly coupled to each of the intake runners.

FIG. 13 shows a relative positioning of cylinders 118 in the inline-4 arrangement of engine system 10. For example, a first cylinder 1350 and a fourth cylinder 1356 may be referred to herein as outer cylinders or flanking cylinders, and a second cylinder 1352 and a third cylinder 1354 may be referred to herein as inner cylinders, with the inner cylinders positioned between each of the outer cylinders along an axis 1318. FIG. 14 shows an enlarged view of the inner cylinders (e.g., second cylinder 1352 and third cylinder 1354).

The intake manifold 422 included by engine system 10 is an integrated intake manifold having intake runners (e.g., intake passages) formed by interior surfaces of the cylinder head 114. The intake runners include both helical-shaped intake runners and non-helical-shaped intake runners positioned in an alternating arrangement relative to the cylinders 118. For example, first cylinder 1350 is coupled to a first non-helical runner 1300 and a first helical runner 1302, second cylinder 1352 is coupled to a second non-helical runner 1304 and a second helical runner 1306, third cylinder 1354 is coupled to a third helical runner 1308 and a third non-helical runner 1310, and fourth cylinder 1356 is coupled to a fourth helical runner 1312 and a fourth non-helical runner 1314.

In this arrangement, the runners coupled to the first cylinder 1350 and second cylinder 1352 are in an antisymmetric arrangement relative to the runners coupled to the third cylinder 1354 and fourth cylinder 1356. Specifically, the runners coupled to the first cylinder 1350 and second cylinder 1352 form a first runner group 1370, and the runners coupled to the third cylinder 1354 and fourth cylinder 1356 form a second runner group 1372, with the runners of the first runner group 1370 being positioned in an opposite arrangement relative to the runners of the second runner group 1372. For example, in outward directions (e.g., radial directions) from the central axis 1390, the first runner group 1370 and second runner group 1372 each include helical runners positioned adjacent to the central axis 1390 (e.g., second helical runner 1306 and third helical runner 1308, respectively), followed firstly in the outward directions by non-helical runners (e.g., 1304 and 1310, respectively), followed secondly in the outward directions by helical runners (e.g., 1302 and 1312, respectively), and followed thirdly in the outward directions by non-helical runners (1300 and 1314, respectively). In embodiments in which the engine includes a different number and/or arrangement of cylinders, the intake runners are arranged in a similar arrangement (e.g., with the first runner group being positioned across the central axis from the second runner group and having an opposite arrangement of runners relative to the second runner group).

The helical runners (e.g., 1302, 1306, 1308, and 1312) are shaped to increase an amount of swirl (e.g., turbulence) of intake air flowing through the helical runners toward the corresponding coupled cylinders 118 by an amount greater than the non-helical runners (e.g., 1300, 1304, 1310, 1314). In one example, the helical runners may be formed with a helix shape (e.g., formed as passages twisting around a direction of air flow through the passages) and the non-helical runners may be formed with a relatively cylindrical shape (e.g., smooth and not twisting). In other examples, the helical runners and/or non-helical runners may have a different type of shape. However, in each example, the helical runners are shaped to increase the amount of swirl of the intake air by an amount greater than the non-helical runners. In this way, an amount of mixing of fuel and intake air within the cylinders 118 may be increased as fuel is injected into the cylinders 118 by the fuel injectors 124, thereby increasing an efficiency of combustion of the fuel and intake air within the cylinders 118 (e.g., decreasing an amount of uncombusted fuel/intake air within the cylinders 118).

FIG. 14 shows an enlarged view of the second cylinder 1352 and third cylinder 1354 depicting a relative arrangement of intake ports, exhaust ports, and glow plugs coupled to the cylinders 1352 and 1354. For example, second cylinder 1352 includes exhaust ports 1408 and 1410, intake ports 1430 and 1432, and glow plug 1404. Third cylinder 1354 includes exhaust ports 1412 and 1414, intake ports 1434 and 1436, and glow plug 1406. Intake port 1430 and intake port 1432 of second cylinder 1352 are coupled with second non-helical runner 1304 and second helical runner 1306 (respectively) of the first runner group 1370. Intake port 1434 and intake port 1436 are coupled to third helical runner 1308 and third non-helical runner 1310 (respectively) of the second runner group 1372. The glow plug 1404 coupled to second cylinder 1352 extends downward into the second cylinder 1352 from the cylinder head 114 at a midpoint of the second cylinder 1352. Similarly, the glow plug 1406 coupled to third cylinder 1354 extends downward into the third cylinder 1354 from the cylinder head 114 at a midpoint of the third cylinder 1354. Other cylinders included by the engine system 10 include a similar glow plug arrangement (e.g., first cylinder 1350 and fourth cylinder 1356).

In order to reduce a likelihood of fuel injected by the fuel injectors 124 from impinging on the glow plugs (e.g., glow plugs 1404 and 1406) and to accommodate for the alternating arrangement of the intake runners and the increased amount of intake air swirl as described above, the fuel injectors 124 may be positioned at different angles relative to each other (e.g., with different spray patterns and/or directions) as described below with reference to FIGS. 15-16.

FIG. 15 shows a view of two example fuel injectors coupled to the engine system 10, and FIG. 16 shows a relative arrangement of the fuel injectors 124 with the engine system 10 omitted for illustrative purposes. The position of each fuel injector is described with reference to the axis 1318 shown by FIGS. 13-16.

A first fuel injector 1616 includes solenoid valve 1612 and is fluidly coupled to fuel line 1504, fuel return line 1608, and first cylinder 1350. A second fuel injector 1500 includes solenoid valve 1508 and is fluidly coupled to fuel line 1504, fuel return line 1512, and second cylinder 1352. A third fuel injector 1502 includes solenoid valve 1510 and is fluidly coupled to fuel line 1506, fuel return line 1514, and third cylinder 1354. A fourth fuel injector 1618 includes solenoid valve 1614 and is fluidly coupled to fuel line 1506, fuel return line 1610, and fourth cylinder 1356. Each fuel injector is shown with a corresponding axis positioned parallel to a direction of fuel flow into the fuel injector from the corresponding solenoid valve of the fuel injector. For example, first fuel injector 1616 is positioned along axis 1604, second fuel injector 1500 is positioned along axis 1520, third fuel injector 1502 is positioned along axis 1522, and fourth fuel injector 1618 is positioned along axis 1606. Axis 1604 is at a first angle 1600 relative to axis 1318, axis 1520 is at a second angle 1516 relative to axis 1318, axis 1522 is at a third angle 1518 relative to axis 1318, and axis 1606 is at a fourth angle 1602 relative to axis 1318.

The first angle 1600, second angle 1516, third angle 1518, and fourth angle 1602 may each be a different amount of angle such that the first fuel injector 1616, second fuel injector 1500, third fuel injector 1502, and fourth fuel injector 1618 each inject fuel into their respective coupled cylinders at different angles relative to each other. For example, an amount and/or direction of swirl of intake air flowing into the first cylinder 1350 may be different than an amount and/or direction of swirl of intake air flowing into the second cylinder 1352 due to the arrangement of the intake runners as described above with reference to FIGS. 13-14. As a result, the second angle 1516 of the second fuel injector 1500 may be a different amount of angle than the first angle 1600 of the first fuel injector 1616 so that a fuel spray pattern and/or fuel spray angle of the second fuel injector 1500 is different than a fuel spray pattern and/or fuel spray angle of the first fuel injector 1616. In this way, each fuel injector may be angled separately in order to achieve a relatively equal combustion efficiency for each of the cylinders 118. In other examples, one or more of the angles of the fuel injectors may be a same amount of angle, with at least one fuel injector having a different amount of angle.

FIG. 17 shows a view of the exhaust manifold 128 coupled to the cylinder head 114 of the engine system 10. A sealing section 1710 of a gasket 1700 is positioned at an interface between the cylinder head 114 and the exhaust manifold 128 and fluidly seals the interface between the cylinder head 114 and exhaust manifold 128 (e.g., prevents leaking of exhaust gas, oil, etc. from the location at which the exhaust manifold 128 is coupled to the cylinder head 114). The gasket 1700 may include a plurality of apertures shaped to align with the exhaust ports of the cylinder head 114 and enable exhaust gases to flow from the exhaust ports into exhaust runners (e.g., passages) of the exhaust manifold 128.

The gasket 1700 additionally includes a heat shielding section 1712 having an upper surface 1706, a lower surface 1707, and a plurality of fluid channels 1704 tapering from the upper surface 1706 to the lower surface 1707. During conditions in which the gasket 1700 is coupled between the cylinder head 114 and the exhaust manifold 128, the fluid channels 1704 are positioned vertically in-line (e.g., in a direction from the upper surface 1706 to the lower surface 1707) with the direction of gravity. Fluid (e.g., oil) impinging upon the gasket 1700 from locations external to the exhaust manifold 128 (e.g., locations vertically above the gasket 1700) may be prevented from leaking onto the exhaust manifold 128 by the gasket 1700 and may instead flow into one or more of the fluid channels 1704. The fluid channels 1704 may direct the fluid away from the exhaust manifold 128, thereby reducing a likelihood of degradation of the exhaust manifold 128. Additionally, the heat shielding section 1712 may be formed of a material resistant to degradation at typical engine operating temperatures (e.g., steel, fiberglass, etc.) and may be configured to direct heat from the engine system 10 away from the exhaust manifold 128. In this way, a likelihood of degradation of the exhaust manifold 128 may be further reduced.

FIG. 18 shows an enlarged view of the fuel pump 416 described above. The fuel pump 416 is driven directly by the fuel pump drive gear 412, with the fuel pump drive gear 412 in meshing engagement with the idler gear 406. The fuel pump drive gear 412 includes a first toothed disc 1818 fixedly coupled to a first bearing 1820 and a second toothed disc 1808 rotatably coupled to the first bearing 1820. The second toothed disc 1808 may be normally rotationally fixed relative to the first bearing 1820. However, an operator of the engine system 10 (e.g., a user) may rotate the second toothed disc 1808 relative to the first bearing 1820 and the first toothed disc 1818 by rotating a first adjustment pin 1830 of the fuel pump drive gear 412. By rotating the second toothed disc 1808 relative to the first bearing 1820 via the first adjustment pin 1830 (e.g., in direction 1850), a position of teeth of the second toothed disc 1808 may be adjusted relative to teeth of the idler gear 406 (as described further below).

The idler gear 406 includes a third toothed disc 1814 fixedly coupled to a second bearing 1834 and a fourth toothed disc 1817 rotatably coupled to the second bearing 1834. The fourth toothed disc 1817 may be normally rotationally fixed relative to the second bearing 1834. However, the operator of the engine system 10 may rotate the fourth toothed disc 1817 relative to the second bearing 1834 and the third toothed disc 1814 by rotating a second adjustment pin 1836 of the idler gear 406. By rotating the fourth toothed disc 1817 relative to the second bearing 1834 via the second adjustment pin 1836 (e.g., in direction 1850), a position of teeth of the fourth toothed disc 1817 may be adjusted relative to teeth of the third toothed disc 1814.

In the configuration described above, the first toothed disc 1818 is in meshing engagement with the third toothed disc 1814 and the second toothed disc 1808 is in meshing engagement with the fourth toothed disc 1817. First inset 1800 shows an example engagement of the fuel pump drive gear 412 with the idler gear 406. In this example, the teeth of the fourth toothed disc 1817 are shown in a first position relative to teeth of the third toothed disc 1814. The fourth toothed disc 1817 may be rotated to a second position shown by second inset 1802 via rotation of the first adjustment pin 1830 in order to move the teeth of the fourth toothed disc 1817 in a direction 1844 relative to the teeth of the third toothed disc 1814. Moving the fourth toothed disc 1817 to the second position shown by second inset 1802 reduces an amount of gap between the teeth of the fourth toothed disc 1817 and the teeth of the second toothed disc 1808. By reducing the amount of gap between the teeth as described above, an amount of vibration of the idler gear 406 and/or fuel pump drive gear 412 may be reduced. By reducing the amount of vibration of the gears, degradation of the fuel pump 416 may be reduced and engine torque transfer to the fuel pump 416 may be increased.

In this way, a technical effect of reducing side loading of a fuel pump may be achieved, by driving a fuel pump via a series of gears that transmit torque from a crankshaft to the fuel pump. Further, frictional losses incurred between fuel pump and crankshaft may be reduced relative to systems where belts and pulleys are used to couple the crankshaft to the fuel pump. Further still, by driving the fuel pump with the series of gears as opposed to belts or chains, a technical effect of reducing the distance between the crankshaft and the fuel pump may be achieved, thus reducing the size, packaging, and cost of the engine system.

Another technical effect of reducing engine size and increasing compactness is achieved by coupling a camshaft drive belt to an idler gear driven by a crankshaft gear, and having a larger diameter than a crankshaft gear. Since the idler gear may rotate at a slower rate than the crankshaft, the size of the camshaft pulleys may be reduced, thereby reducing the overall size, packaging, and cost of the engine system relative to systems where the camshaft belt is directly coupled to the crankshaft. The size, packaging, and cost of the engine system may further by reduced by arranging the crankshaft gear, idler gear, and fuel pump drive gear in parallel with one another along the same plane. By positioning the gears in the same plane, the length of the engine system may be reduced relative to systems where the pump is driven by a belt or chain.

In one embodiment, a front end of an engine comprises: a first end of a crankshaft; an idler gear assembly including an idler gear and an idler pulley, the idler gear in meshing engagement with the first end of the crankshaft and the idler pulley coupled to and sharing a rotational axis with the idler gear; first and second camshaft pulleys positioned vertically above the idler gear assembly; and a cam drive belt contacting each of the first and second camshaft pulleys and the idler pulley. A second example of the front end optionally includes the first example, and further includes wherein the cam drive belt does not contact the crankshaft. A third example of the front end optionally includes one or both of the first and second examples, and further includes wherein the front end of the engine is arranged opposite to a back end of the engine, the back end including a flywheel coupled to a second end of the crankshaft. A fourth example of the front end optionally includes one or more or each of the first through third examples, and further includes wherein the first and second camshaft pulleys have a same diameter and are positioned adjacent to one another at a top side of the front end of the engine relative to a vertical axis of the engine, the top side arranged opposite a bottom side of the engine, the bottom side including an oil pan. A fifth example of the front end optionally includes one or more or each of the first through fourth examples, and further includes wherein the idler pulley has a smaller diameter than the idler gear and wherein the cam drive belt contacts an outer circumferential surface of the idler pulley. A sixth example of the front end optionally includes one or more or each of the first through fifth examples, and further includes wherein the first end of the crankshaft rotates in a first direction, the idler assembly rotates in a second direction, opposite the first direction, and the first and second camshaft pulleys rotate in the second direction. A seventh example of the front end optionally includes one or more or each of the first through sixth examples, and further includes a first end of a first camshaft directly coupled to the first camshaft pulley and a second end of a second camshaft directly coupled to the second camshaft pulley, wherein the first and second camshafts rotate in a direction opposite a direction of rotation of the first end of the crankshaft. An eighth example of the front end optionally includes one or more or each of the first through seventh examples, and further includes wherein the idler gear has 63 teeth, the first end of the crankshaft has 45 teeth, and each of the first and second camshaft pulleys has 21 teeth. A ninth example of the front end optionally includes one or more or each of the first through eighth examples, and further includes an oil pump drive gear drivingly coupled to the first end of the crankshaft via an oil pump drive belt, wherein the oil pump drive belt, oil pump drive gear, cam drive belt, and first and second camshaft pulleys are all arranged in a same plane at the front end of the engine. A tenth example of the front end optionally includes one or more or each of the first through ninth examples, and further includes a fuel pump drive gear in meshing engagement with the idler gear, the fuel pump drive gear directly coupled to a drive shaft of a fuel pump.

In one embodiment, a method for an engine comprises: transmitting rotational motion from a crankshaft to an idler gear, the idler gear meshing with a first end of the crankshaft via a plurality of interlocking teeth; rotating an idler pulley directly coupled with the idler gear via rotation of the idler gear, the idler gear and idler pulley sharing a rotational axis; and driving rotation of first and second camshaft pulleys through a cam drive belt driven by the idler pulley, the cam drive belt contacting an outer surface of the first and second camshaft pulleys and the idler pulley. In a first example of the method, transmitting rotational motion from the crankshaft to the idler gear includes rotating the crankshaft in a first direction and rotating the idler gear in a second direction, opposite the first direction, and rotating the idler pulley includes rotating the idler pulley in the second direction. A second example of the method optionally includes the first example, and further includes rotating a first camshaft directly coupled to the first camshaft pulley in the second direction and rotating a second camshaft directly coupled to the second camshaft pulley in the second direction. A third example of the method optionally includes one or both of the first and second examples, and further includes wherein driving rotation of the first and second camshaft pulleys includes rotating the first and second camshaft pulleys at half a speed of rotation of the camshaft. A fourth example of the method optionally includes one or more or each of the first through third examples, and further includes wherein the idler gear, idler pulley, and first and second camshaft pulleys are all arranged at a front end of the engine, the front end opposite a back end of the engine including a flywheel of the engine.

In one embodiment, a system for an engine comprises: a front end, comprising: a first end of a crankshaft; an idler gear assembly including an idler gear and idler pulley, the idler gear in meshing engagement with the first end of the crankshaft and the idler pulley coupled to and sharing a rotational axis with the idler gear; first and second camshaft pulleys coupled to first and second camshafts, respectively; and a cam drive belt contacting each of the first and second camshaft pulleys and the idler pulley and not the first end of the crankshaft; and a back end arranged opposite the front end, the back end including a flywheel coupled to a second end of the crankshaft. In a first example of the system, the idler pulley has a smaller diameter than the idle gear, and the idler gear includes a greater number of teeth than the first end of the crankshaft. A second example of the system optionally includes the first example, and further includes wherein the front end further comprises a fuel pump drive gear in meshing engagement with the idler gear, the fuel pump drive gear directly coupled to a drive shaft of a fuel pump, wherein the fuel pump is positioned more interior to the engine than the front end of the engine. A third example of the system optionally includes one or both of the first and second examples, and further includes wherein the front end further comprises an oil pump drive gear in meshing engagement with a crankshaft pulley directly coupled to the first end of the crankshaft and directly coupled to an input shaft of an oil pump, wherein an oil pump belt contacts each of the crankshaft pulley and the oil pump drive gear. A fourth example of the system optionally includes one or more or each of the first through third examples, and further includes wherein the front end further comprises a tensioner positioned vertically above the idler gear assembly and vertically below the first and second camshaft pulleys, where a side of the tensioner contacts an outer surface of the cam drive belt and wherein an inner surface of the cam drive belt contacts the first and second camshaft pulleys.

In an alternate representation, a system comprises: a cylinder head of an engine; a plurality of passages extending through an interior of the cylinder head and formed by interior surfaces of the cylinder head, the plurality of passages including a first passage forming an exhaust gas outlet at an exterior surface of the cylinder head and a second passage forming a coolant outlet at the exterior surface; and an EGR valve assembly directly coupled to the cylinder head at the exhaust gas outlet and coolant outlet. In a first example of the system, the EGR valve assembly includes a coolant passage coupled directly to the second passage and wherein engine coolant is adapted to flow from the second passage in the cylinder head to the coolant passage of the EGR valve assembly.

In another alternate representation, an EGR cooler comprises: a body having an inlet end and an outlet end; an exhaust gas collection volume positioned within an interior of the body and fluidly coupled to an exhaust outlet formed by an exterior surface of the body at the outlet end; a baffle having a first end shaped to enclose a perimeter of the exhaust outlet within the interior; and an exhaust gas bypass passage extending through the interior of the body from the inlet end of the body to the baffle at a second end of the baffle opposite the first end. In a first example of the EGR cooler, the EGR cooler further includes an exhaust gas outlet positioned at the outlet end, where the exhaust gas outlet is fluidly coupled with the baffle.

In yet another representation, a system comprises: an intake manifold including: a first end positioned opposite to a second end; a main inlet aperture positioned midway between the first end and second end along a central axis; a first intake runner positioned between the central axis and the first end; a second intake runner positioned adjacent to the first intake runner and between the central axis and the second end; a third intake runner positioned adjacent to the first intake runner between the first end and the first intake runner; and a fourth intake runner positioned adjacent to the second intake runner between the second end and the second intake runner; wherein the first intake runner and second intake runner are each helical passages, and wherein the third intake runner and fourth intake runner are each non-helical passages.

In yet another representation, a system comprises: a cylinder bank including a first and second plurality of engine cylinders; an intake manifold including a plurality of helical intake runners positioned in alternating arrangement with a plurality of non-helical intake runners; a first plurality of fuel injectors coupled to the first plurality of engine cylinders and angled in a first direction relative to a centerline of the cylinder bank; and a second plurality of fuel injectors coupled to the second plurality of engine cylinders and angled in a second direction opposite to the first direction relative to the centerline.

In yet another representation, a system for an intake manifold of an engine includes: four engine cylinders arranged in an in-line configuration; a main intake inlet fluidly coupled to each of the four engine cylinders and centered along a central axis of the intake manifold, where two cylinders of the four engine cylinders are symmetrically arranged on opposite sides of the central axis; a plurality of helical intake runners, where each of the four engine cylinders is fluidly coupled to the main intake inlet via one of the plurality of helical intake runners; and a plurality of non-helical intake runners, where each of the four engine cylinders is fluidly coupled to the main intake inlet via one of the plurality of non-helical intake runners, and where the plurality of helical intake runners and plurality of non-helical intake runners have mirror symmetry across the central axis. In a first example of the system for the intake manifold, the system further includes a plurality of fuel injectors, where each fuel injector of the plurality of fuel injectors is coupled to a different engine cylinder of the four engine cylinders and arranged at a different angle than other fuel injectors of the plurality of fuel injectors. In a second example of the system for the intake manifold, the different angle of each of the fuel injectors is based on a geometry of a corresponding helical intake runner of the corresponding engine cylinder.

In yet another representation, an exhaust manifold gasket comprises: a sealing section shaped to fluidly seal a coupling interface between an exhaust manifold and a cylinder head; and a heat shielding section having an upper surface, a lower surface, and a plurality of fluid channels tapering from the upper surface to the lower surface, the fluid channels being positioned vertically above the sealing section relative to a direction of gravity at the coupling interface.

In yet another representation, a system comprises: a fuel pump; a fuel pump drive gear assembly coupled to the fuel pump including a first drive gear fixedly coupled to a first bearing and a second drive gear rotatably coupled to the first bearing and rotatable relative to the first bearing via a first adjustment pin; and an idler gear assembly including a first idler gear fixedly coupled to a second bearing and a second idler gear rotatably coupled to the second bearing and rotatable relative to the second bearing via a second adjustment pin, the first idler gear in meshing engagement with the first drive gear and the second idler gear in meshing engagement with the second drive gear.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. An exhaust gas recirculation (EGR) system comprising:
a collection volume of an EGR cooler coupled to an exhaust gas inlet of the EGR cooler;
the exhaust gas inlet of the EGR cooler coupled to an exhaust gas outlet of an EGR assembly of an engine system;
inlets of coolant passages of the EGR cooler positioned on flanges connected to an outer circumference of the exhaust gas inlet of the EGR cooler;
the inlets of the coolant passages of the EGR cooler coupled to coolant outlets of the EGR assembly, and the coolant outlets of the EGR assembly coupled to internal coolant passages of a cylinder head of the engine system; and an inlet to a bypass passage formed within the exhaust gas inlet of the EGR cooler, and the bypass passage forming a separate exhaust passage through an interior of the EGR cooler.

2. The EGR system of claim 1, wherein each inlet of the coolant passages of the EGR cooler is formed as an aperture in a respective flange extending outward from the outer circumference of the exhaust gas inlet of the EGR cooler.

3. The EGR system of claim 2, wherein each respective flange of the inlet of the coolant passages of the EGR cooler is fastened to the EGR assembly by at least one bolt through the respective flange.

4. The EGR system of claim 3, wherein coolant flows from the internal coolant passages of the cylinder head into the inlets of the coolant passages of the EGR cooler, and the inlets of the coolant passages of the EGR cooler comprise at least three inlets; and
then, the coolant flows through the interior of the EGR cooler before exiting through a single coolant outlet of the EGR cooler.

5. The EGR system of claim 4, wherein an external coolant passage coupled to the single coolant outlet of the EGR cooler is the only external coolant passage in the engine system.

6. The EGR system of claim 1, wherein the bypass passage forms a passage through the interior of the EGR cooler separate from the collection volume and the bypass passage connects to a second exhaust gas outlet of the EGR cooler, and
the collection volume connects to a first exhaust gas outlet of the EGR cooler.

7. An exhaust gas recirculation (EGR) cooler comprising:
a collection volume coupled to an interior of the EGR cooler and a first exhaust gas outlet;
an exhaust gas inlet to the EGR cooler coupled to an outlet of an EGR assembly of an engine system;
inlets to coolant passages of the EGR cooler positioned on flanges connected to an outside circumference of the exhaust gas inlet;
the inlets to the coolant passages of the EGR cooler coupled to internal coolant passages of a cylinder head of the engine system; and
a bypass passage forming a separate exhaust gas passage within the EGR cooler and connecting a bypass passage inlet and a second exhaust gas outlet, the bypass passage inlet separate from the inlet to the collection volume.

8. The EGR cooler of claim 7, wherein the first exhaust gas outlet is coupled to the collection volume, the bypass passage, and an intake manifold of the engine system.

9. The EGR cooler of claim 8, wherein a baffle is positioned within the interior of the EGR cooler and between the bypass passage and the collection volume.

10. The EGR cooler of claim 9, wherein the baffle is shaped and positioned to surround the second exhaust gas outlet.

11. The EGR cooler of claim 7, further comprising two bolts positioned on opposing side of each inlet to the coolant passages, and the bolts extending around the outside circumference of the exhaust gas inlet to EGR cooler.

12. An exhaust gas recirculation (EGR) cooler comprising:
a collection volume coupled to a body of the EGR cooler;
the collection volume coupled to an exhaust gas outlet of an EGR assembly of an engine system;
coolant passages with inlets positioned along a perimeter of the collection volume, the coolant passages extending through the body of the EGR cooler;
the coolant passages coupled to internal coolant passages of a cylinder head of the engine system; and
a bypass passage forming a separate exhaust gas passage through the body of the EGR cooler.

13. The EGR cooler of claim 12, wherein the coolant passages extend from three inlets to a single coolant outlet.

14. The EGR cooler of claim 12, wherein coolant within the coolant passages removes less heat from exhaust gas within the bypass passage than exhaust gas within the body of the EGR cooler.

15. The EGR cooler of claim 14, wherein the bypass passage is positioned within an interior of the EGR cooler while the coolant passages are positioned outside of the perimeter of the collection volume.

16. The EGR cooler of claim 12, wherein the bypass passage includes a baffle within an interior of the EGR cooler aligned with a second exhaust gas outlet of the EGR cooler, and wherein the baffle separates the bypass passage from the body of the EGR cooler.

17. The EGR cooler of claim 16, wherein the bypass passage and the coolant passages are separated by a wall of the EGR cooler.

18. The EGR cooler of claim 17, wherein the bypass passage routes exhaust gas through the EGR cooler in a path that minimizes heat removal by coolant flowing through the coolant passages.

19. The EGR cooler of claim 12, wherein the coolant passages each pass through an individual flange, and wherein each flange is coupled to the EGR assembly by two fasteners positioned on opposing sides of each coolant passage and extending around an outside circumference of an exhaust gas inlet to the EGR cooler.

20. The EGR cooler of claim 12, further comprising two exhaust gas outlets, a first exhaust gas outlet connected to the collection volume, and a second exhaust gas outlet connected to the bypass passage within the interior of the EGR cooler.

* * * * *